(12) United States Patent
Shibahara et al.

(10) Patent No.: US 7,312,896 B2
(45) Date of Patent: Dec. 25, 2007

(54) DIGITAL PRINTING SYSTEM AND DIGITAL PRINT

(75) Inventors: Yoshihiko Shibahara, Kanagawa (JP); Yoshisada Nakamura, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 972 days.

(21) Appl. No.: 10/689,436

(22) Filed: Oct. 21, 2003

(65) Prior Publication Data

US 2004/0085556 A1 May 6, 2004

(30) Foreign Application Priority Data

Oct. 22, 2002 (JP) .............................. 2002-307372

(51) Int. Cl.
*H04N 1/60* (2006.01)
(52) U.S. Cl. ........................ 358/1.9; 358/518; 358/520
(58) Field of Classification Search ................. 358/1.9, 358/518, 520, 521, 501, 300; 382/167; 347/115
See application file for complete search history.

(56) References Cited

U.S. PATENT DOCUMENTS

| | | | | |
|---|---|---|---|---|
| 4,887,150 A | * | 12/1989 | Chiba et al. ................ | 358/523 |
| 4,985,759 A | * | 1/1991 | Ito .............................. | 358/529 |
| 6,975,437 B2 | * | 12/2005 | Takemoto .................... | 358/518 |
| 2005/0179919 A1 | * | 8/2005 | Kato ........................... | 358/1.9 |
| 2006/0013478 A1 | * | 1/2006 | Ito et al. ..................... | 358/518 |

FOREIGN PATENT DOCUMENTS

| | | |
|---|---|---|
| JP | 2001-059999 A | 3/2001 |
| JP | 2001-166436 A | 6/2001 |

* cited by examiner

*Primary Examiner*—Scott A. Rogers
(74) *Attorney, Agent, or Firm*—Sughrue Mion Pllc.

(57) ABSTRACT

To provide a digital printing system that can satisfactorily reproduce yellow, magenta, and cyan colors, respectively, and can excellently reproduce specific skin tones and have significantly improved sensory image quality, a digital printing system reproduces a yellow (Y) color having a* and b* values of −15 to 0 and +71 to +85, respectively, in the CIE 1976 (L*a*b*) color space at a blue density of 1.0; a magenta (M) color having a* and b* values of +50 to +65 and −30 to 0, respectively, at a green density of 1.0; and a cyan (C) color having a* and b* values of −45 to −15 and −40 to −5, respectively, at a red density of 1.0 and produces a print having L*, a*, and b* values of +58 to +78, +20 to +30, and +25 to +32, respectively, from digital image data with RGB values of 239, 167, and 127, respectively.

20 Claims, 17 Drawing Sheets

SKIN TONE 1

RATING ON SKIN TONES (RATING ON SINGLE COLORS) × 2+(RATING ON SKIN TONES)

(RATING ON SINGLE COLORS)+(RATING ON SKIN TONES)

(RATING ON SINGLE COLORS)+(RATING ON SKIN TONES)×3

DIGITAL PRINTING SYSTEM AND DIGITAL PRINT

BACKGROUND OF THE INVENTION

1. Field of the Invention

The present invention relates to a digital printing system that can satisfactorily reproduce a yellow (Y) color, a magenta (M) color, and a cyan (C) color, respectively, can excellently reproduce specific skin tones and can produce a print having significantly improved sensory image quality, and to a digital print produced by the digital printing system.

2. Description of the Related Art

In conventional printing systems, colors should be reproduced in high-fidelity hues. For example, specific skin tones can be satisfactorily reproduced in silver halide photographic printing systems (Japanese Patent Application Laid-Open (JP-A) No. 2001-59999 and JP-A No. 2001-166436). However, the printing systems cannot selectively develop one or two of a yellow (Y) color, a magenta (M) color and a cyan (C) color and fails to satisfactorily reproduce these colors. In addition, each of the C, M and Y colors and specific skin tones cannot be reproduced with good hues concurrently.

In the other printing systems than the silver halide photographic printing systems, color reproduction is so designed as to approach the image quality of silver halide photographic images. However, for example, inkjet printing systems invite color mixture of CMY color inks, since these inks are water-soluble, and their coloring agents diffuse or migrate in a horizontal direction (in-plane direction) and in a vertical direction (in a thickness direction). The inkjet printing systems may also induce variations in color density caused by diffusion of the coloring agents in a vertical direction. In addition, a variety of inkjet image-receiving sheets having different diffusibility of coloring agents are used in the inkjet printing system. Thus, each of the C, M and Y colors, respectively, and specific skin tones cannot be reproduced with good hues concurrently.

A sublimation dye transfer printing system and an electrophotographic printing system may reproduce each of the C, M and Y colors and specific skin tones with good hues concurrently more satisfactorily than the inkjet printing system. However, these systems are not so designed. To reproduce each of the C, M and Y colors and specific skin tones with good hues concurrently, (i) the system must produce a print having overall uniform gloss, (ii) a dedicated sheet must be prepared so as to uniquely define the relationship between the amount of a toner or a dye and the color density, and (iii) the system must include a color conversion three-dimensional look-up table (LUT). However, such technologies have not yet been developed.

SUMMARY OF THE INVENTION

Accordingly, an object of the present invention is to provide a digital printing system that can satisfactorily reproduce a yellow (Y) color, a magenta (M) color, and a cyan (C) color and can excellently reproduce specific skin tones and have significantly improved sensory image quality and is especially suitable for use as an electrophotographic printing system or a sublimation dye transfer printing system and to provide a digital print printed by the digital printing system.

After intensive investigations to achieve the above object, the present inventors have found that a system can produce an image with surprisingly significantly improved sensory image quality, by specifying color reproducibility in hues of the yellow (Y) color, the magenta (M) color, the cyan (C) color, respectively, and the specific skin tones in a digital printing system for processing digital image data using at least three, yellow (Y), magenta (M), and cyan (C) coloring materials.

Specifically, the present invention provides a digital printing system for processing digital image data and producing a printed output using at least yellow (Y), magenta (M), and cyan (C) coloring materials, wherein the system is so configured as to reproduce:

a yellow (Y) color having a* and b* values of −15 to 0 and +71 to +85, respectively, in the CIE 1976 (L*a*b*) color space at a blue density of 1.0 using the yellow (Y) coloring material alone;

a magenta (M) color having a* and b* values of +50 to +65 and −30 to 0, respectively, in the CIE 1976 (L*a*b*) color space at a green density of 1.0 using the magenta (M) coloring material alone;

a cyan (C) color having a* and b* values of −45 to −15 and −40 to −5, respectively, in the CIE 1976 (L*a*b*) color space at a red density of 1.0 using the cyan (C) coloring material alone; and wherein the system is so configured as to produce a printed output having L*, a*, and b* values of +58 to +78, +20 to +30, and +25 to +32, respectively, in the CIE 1976 (L*a*b*) color space from digital image data having red (R), green (G), and blue (B) values of 239, 167, and 127, respectively, in the RGB color space. The digital printing system of the present invention can satisfactorily reproduce the yellow (Y) color, the magenta (M) color, and the cyan (C) color, respectively, and can satisfactorily reproduce specific skin tones concurrently and is suitably used as an electrophotographic printing system, a sublimation dye transfer printing system, and a marking printing system.

CIE 1976 allows the specification of color perceptions in terms of a three-dimensional space. The L*-axis is known as the lightness and extends from 0 (black) to 100 (white). The other two coordinates a* and b* represent redness-greeness and yellowness-blueness respectively. Samples for which a*=b*=0 are achromatic and thus the L*-axis represents the achromatic scale of grays from black to white.

The quantities L*, a*, and b* are obtained from the tristimulus values X, Y, and Z according to the following transformations:

$$L^* = 116(Y/Y_n)^{1/3} - 16,$$

$$a^* = 500[(X/X_n)^{1/3} - (Y/Y_n)^{1/3}],$$

$$b^* = 200[(Y/Y_n)^{1/3} - (Z/Z_n)^{1/3}],$$

where $X_n$, $Y_n$, and $Z_n$ are the values of X, Y, and Z for the illuminant that was used for the calculation of X, Y, and Z of the sample, and the quotients $X/X_n$, $Y/Y_n$, and $Z/Z_n$ are all greater than 0.008856.

The present invention further provides a digital print produced by the digital printing system. The resulting digital print is of high quality and has significantly improved sensory image quality.

Figure 1:
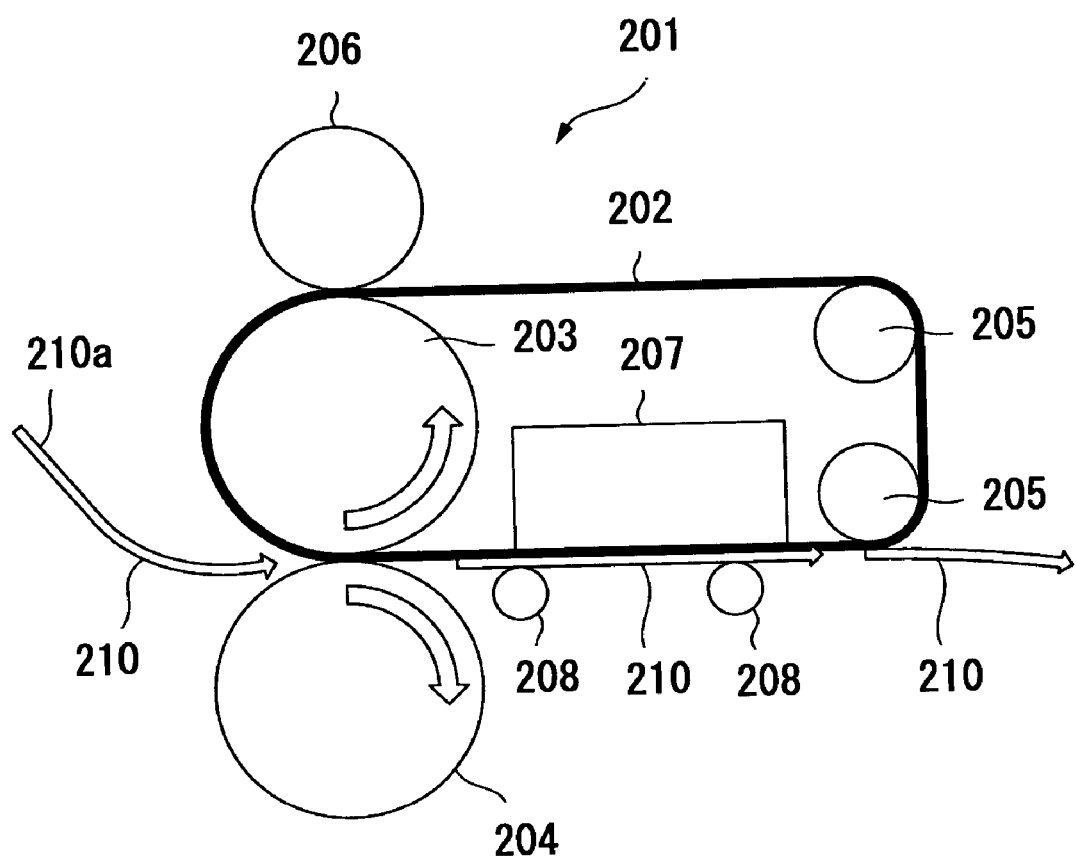
FIG. 1 is a schematic diagram showing an example of a belt fixing and smoothing device of cooling and releasing system for use in the present invention.

DESCRIPTION OF THE PREFERRED EMBODIMENTS (Digital Printing System and Digital Print)

The digital printing system of the present invention is so configured as to process digital image data to thereby produce a printed output using at least yellow (Y), magenta (M), and cyan (C) coloring materials.

The digital print of the present invention is printed out by the digital printing system.

The digital printing system of the present invention will be illustrated in detail below, together with the digital print of the present invention.

The digital printing system is suitably used, for example, as an electrophotographic printing system and a sublimation dye transfer printing system and has a varying configuration according to the use. The digital printing system comprises, for example, image processing means and image output control means and may further comprises other devices selected according to the purpose.

The digital image data are not specifically limited, may be selected according to the purpose and include, for example, photographed data, and data obtained by subjecting the photographed data to additional processing.

Examples of the digital image data are (1) data photographed with a digital still camera (DSC), (2) data captured from a digital video (DV), and (3) data scanned from a silver halide photographic film or print. Each of these data can be used alone or in combination.

An apparatus for the image processing and image output control is not specifically limited, may be selected according to the purpose and includes, for example, (1) an apparatus capable of capturing any image data from a portable memory on which image data are recorded, (2) an apparatus capable of accessing a network and capable of capturing image data accumulated in a server connected to the network, (3) an apparatus capable of scanning an analog image and capturing the image as a digital image, (4) an apparatus capable of connecting to a mobile data terminal and capable of capturing image data from the mobile data terminal, (5) an apparatus capable of selectively performing any additional image processing, (6) an apparatus capable of distinguishing between characters and graphic images and capable of performing a specific image processing, and (7) an apparatus using a color conversion three-dimensional lookup table (LUT). Each of these apparatus can be used alone or in combination.

The digital printing system is so configured as to reproduce specific hues of the yellow (Y) color, magenta (M) color, cyan (C) color, respectively, and hues of the specific skin tones.

The specific hues of the yellow (Y) color, the magenta (M) color, and the cyan (C) color are as follows.

The yellow (Y) color has a* and b* values of −15 to 0 and +71 to +85, respectively, in the CIE 1976 (L*a*b*) color space at a blue density of 1.0.

The term "yellow (Y) color" used herein means a color of a print produced by using a yellow (Y) coloring material alone without using the other coloring materials.

The magenta (M) color has a* and b* values of +50 to +65 and −30 to 0, respectively, in the CIE 1976 (L*a*b*) color space at a green density of 1.0.

The term "magenta (M) color" used herein means a color of a print produced by using a magenta (M) coloring material alone without using the other coloring materials.

The cyan (C) color has a* and b* values of −45 to −15 and −40 to −5, respectively, in the CIE 1976 (L*a*b*) color space at a red density of 1.0.

The term "cyan (C) color" used herein means a color of a print produced by using a cyan (C) coloring material alone without using the other coloring materials.

If reproduced yellow (Y), magenta (M), and cyan (C) colors having a* and b* values out of the above-specified ranges, respectively, the resulting print may not have a desirable hue.

According to the present invention, the system must satisfy all the requirements in hues of the yellow (Y) color, magenta (M) color, and cyan (C) color and must at least satisfy a requirement on the hue of a print produced from digital image data having red (R), green (G), and blue (B) values of 239, 167, and 127, respectively, in the RGB color space (Skin Tone 2).

Specifically, the system is so configured as to produce a printed output having L*, a*, and b* values of +58 to +78, +20 to +30, and +25 to +32, respectively, in the CIE 1976 (L*a*b*) color space from digital image data having red (R), green (G), and blue (B) values of 239, 167, and 127, respectively, in the RGB color space.

If reproduced Skin Tone 2 has a hue out of the above-specified range, the color of a portrait print is undesirable, which color of portrait print is an important factor in photographic image quality.

The red (R), green (G), and blue (B) values are each a red density, a green density, and a blue density in 256 levels from 0 to 255. Decreasing RGB values mean increasing color densities. For example, white has RGB values of 255, 255, and 255. Black has RGB values of 0, 0, and 0. Red has RGB values of 0, 255, and 255.

The RGB values (RGB densities) can be measured with, for example, a Gretag color densitometer, commercially available from Gretag-Macbeth GmbH in Regensdorf, Switzerland or an X-Rite color densitometer, commercially available from X-Rite, of Grandville, Mich., at a regular Status A density.

The system is preferably so configured as to produce a printed output having L*, a*, and b* values of +70 to +90, +10 to +20, and +10 to +20, respectively, in the CIE 1976 (L*a*b*) color space from digital image data having RGB values of 255, 206, and 179, respectively (Skin Tone 1).

The system is also preferably so configured as to produce a printed output having L*, a*, and b* values of +33 to +53, +10 to +20, and +20 to +27, respectively, in the CIE 1976 (L*a*b*) color space from digital image data having RGB values of 144, 99, and 59, respectively, in the RGB color space (Skin Tone 3).

The system must satisfy all the requirements in the hues of the yellow (Y) color, the magenta (M) color, and the cyan (C) color and must satisfy at least the requirement in the hue of Skin Tone 2 and should preferably satisfy all the requirements in the hues of the Skin Tones 1, 2 and 3. Thus, the system can produce a printed output with good hues both in the single colors and in the specific skin tones.

The L*a*b* values can be determined according to a conventional procedure at a light source condition of D50 and a view angle of 2 degrees.

The resulting print has a 45-degree glossiness of preferably 60 degrees or more, and more preferably 80 degrees or more in its entire area.

If the 45-degree glossiness is less than 60 degrees even in a part of the print, the color may become heterogeneous and may not be reproduced satisfactorily.

The 45-degree glossiness can be determined according to Japanese Industrial Standards (JIS) Z 8741 using a conventional glossimeter at an incident angle of 45 degrees and a reflection angle of 45 degrees.

The digital printing system preferably uses a color conversion three-dimensional look-up table (LUT) for better reproduction of colors.

The color conversion three-dimensional look-up table (LUT) is used to reproduce image data desirably on a print and can freely correct, without mixing, an image produced from digitized CCD signals derived from original image data as in a "gamma table".

The digital printing system of the present invention can satisfactorily reproduce the CMY colors and the specific skin tones and is useful, for example, as an electrophotographic printing system and a sublimation dye transfer printing system.

(Electrophotographic Printing System)

The electrophotographic printing system is, for example, so configured as to fix a color toner to an electrophotographic image-receiving sheet using a belt fixing and smoothing device of cooling and releasing system to thereby produce a print. The belt fixing and smoothing device used herein comprises a heating and pressuring member, a belt member, a cooling device, and a cooling and separating unit.

<Electrophotographic Image-receiving Sheet>

The electrophotographic image-receiving sheet comprises a support and at least one toner image-receiving layer arranged on the support. The support herein may be coated paper, cast paper or a support comprising a base and a polyolefin resin layer arranged at least on one side of the base. The sheet may further comprise at least one of additional layers appropriately selected according to necessity. Such additional layers include, for example, surface protective layers, interlayers, undercoat layers, cushioning layers, charge-control or antistatic layers, reflective layers, color-control layers, storage-stability improving layers, adhesion inhibiting layers, anticurling layers, and smoothing layers. These layers may have a single-layer structure or a laminated structure.

—Base—

The base for use in the present invention is not specifically limited and can be appropriately selected according to an intended purpose, as long as it can endure at an image-fixing temperature and can satisfy requirements in smoothness, whiteness, slidability, frictionality, antistatic properties, and depressions after image-fixing. Such bases generally include, for example, photographic supports such as paper and synthetic polymers (films) as described in "Basis of Photographic Technology-silver halide photography-" edited by The Society of Photographic Science and Technology of Japan, Corona Publishing Co., Ltd., pp. 223-240 (1979).

Examples of the base include synthetic paper (synthetic paper made from, for example, polyolefins or polystyrenes), woodfree paper, art paper, (double-sided) coated paper, (double-sided) cast coat paper, mixed paper made from polyethylene or another synthetic resin pulp and natural pulp; Yankee paper, baryta paper, wallpaper, backing paper, synthetic resin- or emulsion-impregnated paper, synthetic rubber latex-impregnated paper, paper comprising a synthetic resin as an internal additive, paperboard, cellulosic fiber paper, and other paper supports; films and sheets of plastics or polymers such as polyolefins, poly(vinyl chloride), poly(ethylene terephthalate), poly(styrene methacrylate), poly(ethylene naphthalate), polycarbonate-poly(vinyl chloride), polystyrenes, polypropylenes, polyimides, celuloses such as triacetylcellulose; films and sheets obtained by subjecting these plastic films and sheets to a treatment, such as addition of a pigment such as titanium oxide for imparting white-reflecting properties; fabrics; metals, and glass.

These may be used either alone, or in combination of two or more as a laminate.

Examples of the base can also be found in JP-A No. 62-253159 (pp. 29-31 in Japanese), JP-A No. 01-61236 (pp. 14-17 in Japanese), JP-A No. 63-316848, JP-A No. 02-22651, JP-A No. 03-56955, and U.S. Pat. No. 5,001,033.

The base preferably has a high surface smoothness, and specifically, a surface roughness (Oken method smoothness) of the base is preferably 210 seconds or more, and more preferably 250 seconds or more.

If the surface roughness (Oken smoothness) is less than 210 seconds, an image quality of an image may be poor when the image is formed.

In the present invention, the Oken type smoothness refers to the smoothness specified by the JAPAN TAPPI No. 5 B method.

The thickness of the base is preferably 25 µm to 300 µm, more preferably 50 µm to 260 µm, and still more preferably 75 µm to 220 µm.

The stiffness of the base is not particularly limited, and it may suitably be selected according to the purpose, but it is preferable for an image-receiving paper of photographic image quality that the stiffness be close to that of a base for color silver halide photographs.

The density of the base is preferably 0.7 g/cm$^3$ or more from the viewpoint of fixing properties.

The thermal conductivity of the base is not particularly limited, and it may suitably be selected according to the purpose, but it is preferable, that the thermal conductivity be 0.50 kcal/m.h.° C. or more under the condition of 20° C. and 65% relative humidity, from the viewpoint of fixing properties.

In the present invention, thermal conductivity can be measured according to a method described in JP-A No. 53-66279 using a sheet of paper prepared according to JIS P 8111.

Various additives which are suitably selected according to the purpose may be added to the base provided that the additives do not hinder the effect of the present invention.

Examples of the additives include whitener; conductive agent; filler; pigments and dyes including, for example, titanium oxide, ultramarine blue, and carbon black; and the like.

One or both sides of the base may be given various surface treatments or priming treatments in order to improve adhesion to a layer, layers, or the like deposited on the base.

Examples of the surface treatments include embossing treatment for glossy surface, micro-structured surface described in JP-A No. 55-26507, matte surface, and silky surface; corona discharge treatment; flame treatment; glow discharge treatment; activation treatment such as, for example, plasma treatment; and the like.

Only one of these treatments may be carried out, or any of these treatments may be used in combination; for example, the activation treatment may be carried out after the embossing treatment, or the priming treatment may be acted upon after a surface treatment such as the activation treatment or the like.

The front side, the back side, or both sides of the base may be coated with a hydrophilic binder; a semiconductor metal oxide such as alumina sol, tin oxide, and the like; and an electrification preventing agent such as carbon black and the like. Specific examples of the base are supports described in, for example, JP-A No. 63-220246.

—Polyolefin Resin Layer—

The support for use in the present invention preferably comprises the base and a polyolefin resin layer arranged at least on one side of the base. The polyolefin resin layer mainly comprises at least one polyolefin resin such as a polyethylene or a polypropylene.

The polyethylene can be, for example, a high-density polyethylene (HDPE), a low-density polyethylene (LDPE), or a linear low-density polyethylene (LLDPE). The polyolefin resin layer preferably comprises a polypropylene, a high-density polyethylene (HDPE), and/or a linear low-density polyethylene (LLDPE). Each of these resins can be used alone or in combination.

A polyolefin resin is generally formed using low-density polyethylene, but in order to improve heat resistance of the support, it is preferable to use polypropylene, a blend of polypropylene and polyethylene, high-density polyethylene, a blend of high-density polyethylene and low-density polyethylene, or the like. Particularly, from the viewpoint of cost, laminate applicability, and the like, it is most preferable to use a blend of high-density polyethylene and low-density polyethylene.

For the blend of high-density polyethylene and low-density polyethylene, its blending ratio (mass ratio) ranges, for example, from 1:9 to 9:1. The blending ratio is preferably from 2:8 to 8:2, and more preferably from 3:7 to 7:3. The molecular weights of the high-density polyethylene and low-density polyethylene are not particularly limited, but it is preferable that melt indices of both high-density polyethylene and low-density polyethylene be from 1.0 g/10-min to 70 g/10-min and that the polyethylenes be suitable for extrusion.

A sheet or film of these may receive a treatment to obtain reflectivity of white color. Examples of the treatment include mixing a pigment such as titanium oxide or the like in the sheet or film.

The polyolefin resin layer can be prepared according to any procedure appropriately selected according to the purpose. Such procedures include, for example, dry lamination of a polyolefin film on the base, coating of a solution containing a polyolefin resin in a solvent, coating of an aqueous emulsion of a polyolefin resin, impregnation of the base with such a polyolefin emulsion, and melt extrusion coating. The polyolefin resin layer is preferably prepared by melt extrusion coating for better productivity.

The polyolefin resin layer preferably further comprises a white pigment and/or a fluorescent whitening agent according to necessity, in addition to the polyolefin resin.

The fluorescent whitening agent has absorption in the near-ultraviolet region, and is a compound which emits fluorescence at 400 nm to 500 nm. The various fluorescent whitening agent known in the art may be used without any particular limitation. Examples of the fluorescent whitening agent include the compounds described in "The Chemistry of Synthetic Dyes" Volume V, Chapter 8 edited by K. VeenRataraman. Specific examples of the fluorescent whitening agent include stilbene compounds, coumarin compounds, biphenyl compounds, benzo-oxazoline compounds, naphthalimide compounds, pyrazoline compounds, carbostyryl compounds, and the like. Examples of these include WHITEX PSN, PHR, HCS, PCS, and B from Sumitomo Chemicals, UVITEX-OB from Ciba-Geigy, Co., Ltd., and the like.

Examples of the white pigment are titanium dioxide, calcium carbonate, barium sulfate, and zinc white. Of these, titanium dioxide is preferred for better masking.

The content of the white pigment or the fluorescent whitening agent is preferably from 0.1 g/m$^2$ to 8 g/m$^2$, and more preferably from 0.5 g/m$^2$ to 5 g/m$^2$.

If the content is less than 0.1 g/m$^2$, the polyolefin resin layer may excessively highly transmit light. If it exceeds 8 g/m$^2$, the layer may invite cracking or adhesion and may become difficult to handle.

The thickness of the support is preferably 25 μm to 300 μm, more preferably 50 μm to 260 μm, and still more preferably 75 μm to 220 μm. The support may have any rigidity according to the purpose.

<Toner Image-receiving Layer>

The above-mentioned toner image-receiving layer receives a color or black toner and forms an image. The toner image-receiving layer has a function to receive toner which forms an image from a developing drum or an intermediate transfer by (static) electricity or pressure in a transferring step, and to fix the image by heat or pressure in a fixing step. The toner image-receiving layer contains a thermoplastic resin as a main component, and further contains a release agent and other components.

—Thermoplastic Resin—

The thermoplastic resin is not particularly limited, and it may suitably be selected according to the purpose, provided that it is deformable under certain temperatures, for example during fixing, and that it accepts toner. However, a resin similar to the binder resin of a toner is preferable. Many toners employ a polyester resin or a copolymer resin such as styrene-butylacrylate, and in such case, the thermoplastic resin used for the electrophotographic image-receiving sheet preferably contains a polyester resin or a copolymer resin such as styrene-butylacrylate, more preferably 20% by mass or more of a polyester resin or a copolymer resin such as styrene-butylacrylate. Also preferable are styrene-acrylate copolymers, styrene-methacrylate copolymers, and the like.

Examples of the thermoplastic resins are (i) resins each having an ester bond, (ii) polyurethane resins and similar resins, (iii) polyamide resins and similar resins, (iv) polysulfone resins and similar resins, (v) poly(vinyl chloride) resins and similar resins, (vi) poly(vinyl butyral) and similar resins, (vii) polycaprolactone resins and similar resins, and (viii) polyolefin resins and similar resins.

The resins containing one or more ester bonds (i) include, for example, polyester resins obtained by condensation of a dicarboxylic acid component and an alcoholic component, polyacrylate resins or polymethacrylate resins such as polymethylmethacrylate, polybutylmethacrylate, polymethylacrylate, polybutyl acrylate, or the like; polycarbonate resins, polyvinyl acetate resins, styrene acrylate resins, styrene-methacrylate copolymer resins, vinyltoluene acrylate resins, or the like. Specific examples of the dicarboxylic acid component include terephthalic acid, isophthalic acid, maleic acid, fumaric acid, phthalic acid, adipic acid, sebacic acid, azelaic acid, abietic acid, succinic acid, trimellitic acid, pyromellitic acid, and the like. More preferably, the thermoplastic resin alone satisfies the preferable physical properties. Specific examples of the alcoholic component include ethylene glycol, diethylene glycol, propylene glycol, bisphenol A, diether derivative of bisphenol A (for example, ethylene oxide diadduct of bisphenol A, propylene oxide diadduct of bisphenol A) or bisphenol S, 2-ethyl cyclohexyldimethanol, neopentyl glycol, dicyclohexyldimethanol or glycerol. These may be substituted by hydroxyl groups.

Examples can also be found in JP-A Nos. 59-101395, 63-7971, 63-7972, 63-7973 and 60-294862.

Examples of commercial products of the polyester resins include Bailon 290, Bailon 200, Bailon 280, Bailon 300, Bailon 103, Bailon GK-140 and Bailon GK-130 from Toyobo Co., Ltd; Tufton NE-382, Tufton U-5, ATR-2009 and ATR-2010 from Kao Corporation; Eritel UE3500, UE3210, XA-8153 from Unitika Ltd.; Polyester TP-220 and R-188 from The Nippon Synthetic Chemical Industry Co., Ltd., and the like.

Examples of commercial products of the above-mentioned acrylic resins include SE-5437, SE-5102, SE-5377, SE-5649, SE-5466, SE-5482, HR-169, HR-124, HR-1127, HR-116, HR-113, HR-148, HR-131, HR-470, HR-634, HR-606, HR-607, LR-1065, LR-574, LR-143, LR-396, LR-637, LR-162, LR-469, LR-216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 from Mitsubishi Rayon Ltd.; Esrec P SE-0020, SE-0040, SE-0070, SE-0100, SE-1010, SE-1035 from Sekisui Chemical Co., Ltd.; Himer ST95 and ST120 from Sanyo Chemical Industries, Ltd.; and FM601 from Mitsui Chemicals, Inc., and the like.

The polyvinyl chloride resin and the like (v) include, for example, polyvinylidene chloride resin, vinyl chloride-vinyl acetate copolymer resin, vinyl chloride-vinyl propionate copolymer resin, and the like.

The polyvinyl butyral and the like (vi) include, for example, polyol resins, cellulose resins such as ethyl cellulose resin and cellulose acetate resin, and the like. Examples of commercial products include ones by Denki Kagaku Kogyo Kabushikikaisha, Sekisui Chemical Co., Ltd., and the like. For polyvinyl butyral and the like, it is preferable that the amount of polyvinyl butyral contained be 70% by mass or more and the average extent of polymerization is 500 or more, and more preferably 1000 or more. Examples of commercial products include Denka Butyral 3000-1, 4000-2, 5000A, and 6000C by Denki Kagaku Kogyo Kabushikikaisha; S-LEC BL-1, BL-2, BL-S, BX-L, BM-1, BM-2, BM-5, BM-S, BH-3, BX-1, BX-7; and the like.

The polycaprolactone resin and the like (vii) include, for example, styrene-maleic anhydride resin, polyacrylonitrile resin, polyether resin, epoxy resin, phenol resin, and the like.

The polyolefin resin and the like (viii) include, for example, polyethylene resin, polypropylene resin, copolymer resins of olefins such as ethylene, propylene, or the like with other vinyl monomers, acrylic resins, and the like.

The thermoplastic resins may be used alone or in combination of two or more, and in addition, a mixture, a copolymer of these resins, and the like may be used.

The thermoplastic resin preferably satisfies toner image-receiving layer properties, which will be described later, when formed into a toner image-receiving layer, and more preferably satisfies the toner image-receiving layer properties by itself. It is also preferable to use in combination two or more resins which have different toner image-receiving layer properties.

The thermoplastic resin preferably has a molecular weight that is larger than that of a thermoplastic resin used in the toner. However, according to the relationship of the thermodynamic properties of the thermoplastic resin used in the toner and the properties of the resin used in the toner image-receiving layer, the relationship of the molecular weights as described above is not necessarily preferable. For example, when a softening temperature of the resin used in the toner image-receiving layer is higher than that of the thermoplastic resin used in the toner, there are cases in which molecular weight of the resin used in the toner image-receiving layer is preferably the same or smaller.

It is also preferred that the thermoplastic resin be a mixture of resins with identical compositions having different average molecular weights. The preferable relationship with molecular weights of thermoplastic resins used in toners is disclosed in JP-A No. 08-334915.

Molecular weight distribution of the thermoplastic resin is preferably wider than that of the thermoplastic resin used in the toner.

It is preferred that the thermoplastic resin satisfies the physical properties disclosed in JP-A Nos. 05-127413, 08-194394, 08-334915, 08-334916, 09-171265, 10-221877, and the like.

It is particularly preferable that the thermoplastic resin used in a toner image-receiving layer be an aqueous resin such as water-soluble resin, water-dispersible resin, or the like for the following reasons (1) and (2).

(1) Since no organic solvent is discharged in coating and drying processes, it is excellent in environmental preservation and workability. (2) Since many release agents such as wax are difficult to dissolve in a solvent at room temperature, often they are dispersed in a solvent (water or an organic solvent) before use. Further, an aqueous dispersion is more stable and is excellently suitable for a manufacturing process. In addition, with aqueous coating, wax bleeds on the surface more easily during the process of coating and drying, and the effects of a release agent (offset resistance, adhesion resistance, and the like) is facilitated more easily.

The aqueous resin is not particularly limited with regards to its composition, bonding structure, molecular weight, molecular weight distribution, and formation, provided that it is an aqueous resin, water-dispersible resin, or the like. Examples of substituting groups which render a resin aqueous include sulfonic acid group, hydroxyl group, carboxylic acid group, amino group, amide group, ether group, and the like.

Examples of the water-soluble resins are given on page 26 of Research Disclosure No. 17,643, page 651 of Research Disclosure No. 18,716, pp. 873-874 of Research Disclosure No. 307,105, and pp. 71-75 of JP-A No. 64-13546.

Specific examples include a vinyl pyrrolidone-vinyl acetate copolymer, styrene-vinyl pyrrolidone copolymer, styrene-maleic anhydride copolymer, water-soluble polyester, water-soluble acrylic, water-soluble polyurethane, water-soluble nylon, a water-soluble epoxy resin, and the like. Gelatin may be selected from lime treated gelatin, acid treated gelatin, or so-called delimed gelatin in which the amount of calcium and the like is reduced, and it may also be used in combination. Examples of commercial products of aqueous polyester include various Plascoat products by Goo Chemical Co., Ltd., Finetex ES series by Dainippon Ink and Chemicals Inc., and the like; and those of aqueous acrylic resins include Jurymer AT series by Nihon Junyaku Co., Ltd., Finetex 6161 and K-96 by Dainippon Ink and Chemicals Inc., Hiros NL-1189 and BH-997 by Seiko Chemical Industries Co., Ltd., and the like.

The water-dispersible resin may suitably be selected from water-dispersed resins such as water-dispersed acrylic resin, water-dispersed polyester resin, water-dispersed polystyrene resin, water-dispersed urethane resin, and the like; emulsions such as acrylic resin emulsion, polyvinyl acetate emulsion, SBR (styrene butadiene rubber) emulsion, and the like; resins and emulsions in which the thermoplastic resins of (i) to (viii) are water dispersed; and copolymers thereof, mixtures thereof, and those which are cation-modified. Two or more of these may be used in combination.

Examples of commercial products of the water-dispersible resins include, for polyester resins, Vylonal series by Toyobo Co., Ltd., Pesresin A series by Takamatsu Oil & Fat Co., Ltd., Tuftone UE series by Kao Corp., Nichigo Polyester WR series by Nippon Synthetic Chemical Industry Co., Ltd., Elitel series by Unitika Ltd., and the like; and for acrylic resins, Hiros XE, KE, and PE series by Seiko Chemical Industries Co., Ltd., Jurymer ET series by Nihon Junyaku Co., Ltd., and the like.

The minimum film-forming temperature (MFT) of the polymer is preferably room temperature or higher, from the viewpoint of pre-print storage, and preferably 100° C. or lower, from the viewpoint of fixing toner particles.

It is desirable to use a self-dispersing aqueous polyester resin emulsion satisfying the following properties (1) to (4) as the above-mentioned thermoplastic resin in present invention. As this is a self-dispersing type which does not use a surfactant, its hygroscopicity is low even in a high humidity environment, its softening point is not much reduced by moisture, and offset produced during fixing, or sticking of sheets in storage, can be suppressed. Moreover, since it is aqueous, it is very environment-friendly and has excellent workability. As it uses a polyester resin which easily assumes a molecular structure with high cohesion energy, it has sufficient hardness in a storage environment, assumes a melting state of low elasticity (low viscosity) in the fixing step for electrophotography, and toner is embedded in the toner image-receiving layer so that a sufficiently high image quality is attained.

(1) The number average molecular weight (Mn) is preferably 5000 to 10000, and more preferably 5000 to 7000.
(2) The molecular weight distribution (Mw/Mn) (weight average molecular weight/number average molecular weight) is preferably 4 or less, and more preferably 3 or less.
(3) The glass transition temperature (Tg) is preferably 40° C. to 100° C., and more preferably 50° C. to 80° C.
(4) The volume average particle diameter is preferably 20 nm to 200 nm, and more preferably 40 nm to 150 nm.

The content of the thermoplastic resin in the toner image-receiving layer is preferably 10% by mass to 90% by mass, more preferably 10% by mass to 70% by mass, and still more preferably 20% by mass to 60% by mass.

—Releasing Agent—

The releasing agent can be at least one of silicone compounds, fluorine compounds, waxes, and matting agents. Among them, at least one selected from silicone oils, polyethylene waxes, carnauba waxes, silicone particles, and polyethylene wax particles is preferably used.

Specifically, the releasing agent may for example be a compound mentioned in "Properties and Applications of Wax (Revised)" by Saiwai Publishing, or in the Silicone Handbook published by THE NIKKAN KOGYO SHIMBUN. Also, the silicone compounds, fluorine compounds and wax in the toners mentioned in Japanese Patent Application Publication (JP-B) No. 59-38581, Japanese Patent Application Publication (JP-B) No. 04-32380, Japanese Patent (JP-B) No. 2838498, JP-B No. 2949558, Japanese Patent Application Laid-Open (JP-A) No. 50-117433, No. 52-52640, No. 57-148755, No. 61-62056, No. 61-62057, No. 61-118760, and JP-A No. 0242451, No. 03-41465, No. 04-212175, No. 04-214570, No. 04-263267, No. 05-34966, No. 05-119514, No. 06-59502, No. 06-161150, No. 06-175396, No. 06-219040, No. 06-230600, No. 06-295093, No. 07-36210, No. 07-43940, No. 07-56387, No. 07-56390, No. 07-64335, No. 07-199681, No. 07-223362, No. 07-287413, No. 08-184992, No. 08-227180, No. 08-248671, No. 08-248799, No. 08-248801, No. 08-278663, No. 09-152739, No. 09-160278, No. 09-185181, No. 09-319139, No. 09-319143, No. 10-20549, No. 10-48889, No. 10-198069, No. 10-207116, No. 11-2917, No. 11-44969, No. 11-65156, No. 11-73049 and No. 11-194542 may be used. These compounds can also be used in combination of two or more.

Examples of the silicone compounds include non-modified silicone oils (specifically, dimethyl siloxane oil, methyl hydrogen silicone oil, phenyl methyl-silicone oil, or commercial products such as KF-96, KF-96L, KF-96H, KF-99, KF-50, KF-54, KF-56, KF-965, KF-968, KF-994, KF-995 and HIVAC F4, F-5 from Shin-Etsu Chemical Co., Ltd.; SH200, SH203, SH490, SH510, SH550, SH710, SH704, SH705, SH7028A, SH7036, SM7060, SM7001, SM7706, SH7036, SH8710, SH1107 and SH8627 from Dow Corning Toray Silicone Co., Ltd.; and TSF400, TSF401, TSF404, TSF405, TSF431, TSF433, TSF434, TSF437, TSF450 series, TSF451 series, TSF456, TSF458 series, TSF483, TSF484, TSF4045, TSF4300, TSF4600, YF33 series, YF-3057, YF-3800, YF-3802, YF-3804, YF-3807, YF-3897, XF-3905, XS69-A1753, TEX100, TEX101, TEX102, TEX103, TEX104, TSW831, and the like from GE Toshiba Silicones), amino-modified silicone oils (for example, KF-857, KF-858, KF-859, KF-861, KF-864 and KF-880 from Shin-Etsu Chemical Co., Ltd., SF8417 and SM8709 from Dow Corning Toray Silicone Co., Ltd., and TSF4700, TSF4701, TSF4702, TSF4703, TSF4704, TSF4705, TSF4706, TEX150, TEX151 and TEX154 from GE Toshiba Silicones), carboxy-modified silicone oils (for example, BY16-880 from Dow Corning Toray Silicone Co., Ltd., TSF4770 and XF42-A9248 from GE Toshiba Silicones), carbinol-modified silicone oils (for example, XF42-B0970 from GE Toshiba Silicones), vinyl-modified silicone oils (for example, XF40-A1987 from GE Toshiba Silicones), epoxy-modified silicone oils (for example, SF8411 and SF8413 from Dow Corning Toray Silicone Co., Ltd.; TSF3965, TSF4730, TSF4732, XF42-A4439, XF42-A4438, XF42-A5041, XC96-A4462, XC96-A4463, XC96-A4464 and TEX170 from GE Toshiba Silicones), polyether-modified silicone oils (for example, KF-351 (A), KF-352 (A), KF-353 (A), KF-354 (A), KF-355 (A), KF-615(A), KF-618 and KF-945 (A) from Shin-Etsu Chemical Co., Ltd.; SH3746, SH3771, SF8421, SF8419, SH8400 and SF8410 from Dow Corning Toray Silicone Co., Ltd.; TSF4440, TSF4441, TSF4445, TSF4446, TSF4450, TSF4452, TSF4453 and TSF4460 from GE Toshiba Silicones), silanol-modified silicone oils, methacryl-modified silicone oil, mercapto-modified silicone oil, alcohol-modified silicone oil (for example, SF8427 and SF8428 from Dow Corning Toray Silicone Co., Ltd., TSF4750, TSF4751 and XF42-B0970 from GE Toshiba Silicones), alkyl-modified silicone oils (for example, SF8416 from Dow Corning Toray Silicone Co., Ltd., TSF410, TSF411, TSF4420, TSF4421, TSF4422, TSF4450, XF42-334, XF42-A3160 and XF42-A3161 from GE Toshiba Silicones), fluorine-modified silicone oils (for example, FS1265 from Dow Corning Toray Silicone Co., Ltd., and FQF501 from GE Toshiba Silicones), silicone rubbers and silicone fine particles (for example, SH851U, SH745U, SH55UA, SE4705U, SH502 UA&B, SRX539U, SE6770 U-P, DY38-038, DY38-047, Torayfil F-201, F-202, F-250, R-900, R-902A, E-500, E-600, E-601, E-506, BY29-119 from Dow Corning Toray Silicone Co., Ltd.; Tospearl 105, Tospearl 120, Tospearl 130, Tospearl 145, Tospearl 240 and Tospearl 3120 from GE Toshiba Silicones), silicone-modified resins (specifically, olefin resins, polyester resins, vinyl resins, polyamide resins, cellulosic resins, phenoxy resins, vinyl chloride-vinyl acetate resins, urethane resins, acrylic resins, styrene-acrylic resins, compounds in which copolymerization resins thereof are modified by silicone, and the like). Examples of the commercial products include Daiallomer SP203V, SP712, SP2105 and SP3023 from Dainichiseika Color & Chemicals Mfg. Co., Ltd.; Modiper FS700, FS710, FS720, FS730 and FS770 from NOF Corp.; Symac US-270, US-350, US-352, US-380, US-413, US-450, Reseda GP-705, GS-30, GF-150 and GF-300 from TOAGOSEI CO., LTD.; SH997, SR2114, SH2104, SR2115, SR2202, DCI-2577, SR2317, SE4001U, SRX625B, SRX643, SRX439U, SRX488U, SH804, SH840, SR2107 and SR2115 from Dow Corning Toray Silicone Co., Ltd., YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TEX153, TEX171 and TEX172 from GE Toshiba Silicones), and reactive silicone compounds (specifically, addition reaction type, peroxide-curing type and ultraviolet radiation curing type. Commercial examples thereof include: TSR1500, TSR1510, TSR1511, TSR1515, TSR1520, YR3286, YR3340, PSA6574, TPR6500, TPR6501, TPR6600, TPR6702, TPR6604, TPR6700, TPR6701, TPR6705, TPR6707, TPR6708, TPR6710, TPR6712, TPR6721, TPR6722, UV9300, UV9315, UV9425, UV9430, XS56-A2775, XS56-A2982, XS56-A3075, XS56-A3969, XS56-A5730, XS56-A8012, XS56-B1794, SL6100, SM3000, SM3030, SM3200 and YSR3022 from GE Toshiba Silicones), and the like.

Examples of the fluorine compounds include fluorine oils (for example, Daifluoryl #1, Daifluoryl # 3, Daifluoryl #10, Daifluoryl #20, Daifluoryl #50, Daifluoryl #100, Unidyne TG-440, TG-452, TG-490, TG560, TG-561, TG-590, TG-652, TG-670U, TG-991, TG-999, TG-3010, TG-3020 and TG-3510 from Daikin Industries, Ltd.; MF-100, MF-110, MF-120, MF-130, MF-160 and MF-160E from Tohkem Products; S-111, S-112, S-113, S-121, S-131, S-132, S-141 and S-145 from Asahi Glass Co., Ltd.; and, FC-430 and FC-431 from DU PONT-MITSUI FLUOROCHEMICALS COMPANY, LTD.), fluoro rubbers (for example, LS63U from Dow Corning Toray Silicone Co., Ltd.), fluorine-modified resins (for example, Modepa F200, F220, F600, F220, F600, F2020, F3035 from Nippon Oils and Fats; Diaroma FF203 and FF204 from Dai Nichi Pure Chemicals; Saflon S-381, S-383, S-393, SC-101, SC-105, KH-40 and SA-100 from Asahi Glass Co., Ltd.; EF-351, EF-352, EF-801, EF-802, EF-601, TFE, TFEA, TFEMA and PDFOH from Tohkem Products; and THV-200P from Sumitomo 3M), fluorine sulfonic acid compound (for example, EF-101, EF-102, EF-103, EF-104, EF-105, EF-112, EF-121, EF-122A, EF-122B, EF-122C, EF-123A, EF-123B, EF-125M, EF-132, EF-135M, EF-305, FBSA, KFBS and LFBS from Tohkem Products), fluorosulfonic acid, and fluorine acid compounds or salts (specifically, anhydrous fluoric acid, dilute fluoric acid, fluoroboric acid, zinc fluoroborate, nickel fluoroborate, tin fluoroborate, lead fluoroborate, copper fluoroborate, fluorosilicic acid, fluorinated potassium titanate, perfluorocaprylic acid, ammonium perfluorooctanoate, and the like), inorganic fluorides (specifically, aluminum fluoride, potassium fluoride, fluorinated potassium zirconate, fluorinated zinc tetrahydrate, calcium fluoride, lithium fluoride, barium fluoride, tin fluoride, potassium fluoride, acid potassium fluoride, magnesium fluoride, fluorinated titanic acid, fluorinated zirconic acid, ammonium hexafluorinated phosphoric acid, potassium hexafluorinated phosphoric acid, and the like).

Examples of the wax include synthetic hydrocarbon, modified wax, hydrogenated wax, natural wax, and the like.

Examples of the synthetic hydrocarbon include polyethylene wax (for example, polyron A, 393, and H-481 from Chukyo Yushi Co., Ltd.; Sunwax E-310, E-330, E-250P, LEL-250, LEL-800, LEL-400P, from SANYO KASEI Co., Ltd.), polypropyrene wax (for example, biscoal 330-P, 550-P, 660-P from SANYO KASEI Co., Ltd.), Fischer toropush wax (for example, FT100, and FT-0070, from Nippon Seiro Co., Ltd.), an acid amide compound or an acid imide compound (specifically, stearic acid amide, anhydrous phthalic acid imide, or the like; for example, Cellusol 920, B-495, hymicron G-270, G-110, hydrine D-757 from Chukyo Yushi Co., Ltd.), and the like.

Examples of the modified wax include amine-modified polypropyrene (for example, QN-7700 from SANYO KASEI Co., Ltd.), acrylic acid-modified wax, fluorine-modified wax, olefin-modified wax, urethane wax (for example, NPS-6010, and HAD-5090 from Nippon Seiro Co., Ltd.), alcohol wax (for example, NPS-9210, NPS-9215, OX-1949, XO-020T from Nippon Seiro Co., Ltd.), and the like.

Examples of the hydrogenated wax include cured castor oil (for example, castor wax from Itoh Oil Chemicals Co., Ltd.), castor oil derivatives (for example, dehydrated castor oil DCO, DCO Z-1, DCO Z-3, castor oil aliphatic acid CO-FA, ricinoleic acid, dehydrated castor oil aliphatic acid DCO-FA, dehydrated castor oil aliphatic acid epoxy ester D-4 ester, castor oil urethane acrylate CA-10, CA-20, CA-30, castor oil derivative MINERASOL S-74, S-80, S-203, S-42X, S-321, special castor oil condensation aliphatic acid MINERASOL RC-2, RC-17, RC-55, RC-335, special castor oil condensation aliphatic acid ester MINERASOL LB-601, LB-603, LB-604, LB-702, LB-703, #11 and L-164 from Itoh Oil Chemicals Co., Ltd.), stearic acid (for example, 12-hydroxystearic acid from Itoh Oil Chemicals Co., Ltd.), lauric acid, myristic acid, palmitic acid, behenic acid, sebacic acid (for example, sebacic acid from Itoh Oil Chemicals Co., Ltd.), undecylenic acid (for example, undecylenic acid from Itoh Oil Chemicals Co., Ltd.), heptyl acids (heptyl acids from Itoh Oil Chemicals Co., Ltd.), maleic acid, high grade maleic oils (for example, HIMALEIN DC-15, LN-10, LN-00-15, DF-20 and SF-20 from Itoh Oil Chemicals Co., Ltd.), blown oils (for example, selbonol #10, #30, #60, R-40 and S-7 from Itoh Oil Chemicals Co., Ltd.), cyclopentadieneic oil (CP oil and CP oil-S from Itoh Oil Chemicals Co., Ltd., or the like), and the like.

The natural wax is preferably any wax selected from vegetable wax, animal wax, mineral wax, and petroleum wax, among which vegetable wax is particularly preferable. The natural wax is also preferably a water-dispersible wax, from the viewpoint of compatibility when a water-dispersible thermoplastic resin is used as the thermoplastic resin in the toner image-receiving layer.

Examples of the vegetable wax include carnauba wax (for example, EMUSTAR AR-0413 from Nippon Seiro Co., Ltd., and Cellusol 524 from Chukyo Yushi° Co., Ltd.), castor oil (purified castor oil from Itoh Oil Chemicals Co., Ltd.), rapeseed oil, soybean oil, Japan tallow, cotton wax, rice wax, sugarcane wax, candellila wax, Japan wax, jojoba oil, and the like. Of these, carnauba wax having a melting point of 70° C. to 95° C. is particularly preferable from viewpoints of providing an electrophotographic image-receiving sheet which is excellent in anti-offset properties, adhesive resistance, paper transporting properties, gloss, is less likely to cause crack and splitting, and is capable of forming a high quality image.

Examples of the animal wax include bees wax, lanolin, spermaceti, whale oil, wool wax, and the like.

Examples of the mineral wax include montan wax, montan ester wax, ozokerite, ceresin, and the like, aliphatic acid esters (Sansosizer-DOA, AN-800, DINA, DIDA, DOZ, DOS, TOTM, TITM, E-PS, nE-PS, E-PO, E-4030, E-6000, E-2000H, E-9000H, TCP, C-1100, and the like, from New Japan Chemical Co., Ltd.), and the like. Of these, montan wax having a melting point of 70° C. to 95° C. is particularly preferable from viewpoints of providing an electrophotographic image-receiving sheet which is excellent in anti-offset properties, adhesive resistance, paper transporting properties, gloss, is less likely to cause crack and splitting, and is capable of forming a high quality image.

Examples of the petroleum wax include paraffin wax (for example, Paraffin wax 155, Paraffin wax 150, Paraffin wax 140, Paraffin wax 135, Paraffin wax 130, Paraffin wax 125, Paraffin wax 120, Paraffin wax 115, HNP-3, HNP-5, HNP-9, HNP-10, HNP-11, HNP-12, HNP-14G, SP-0160, SP-0145, SP-1040, SP-1035, SP-3040, SP-3035, NPS-8070, NPS-L-70, OX-2151, OX-2251, EMUSTAR-0384 and EMUSTAR-0136 from Nippon Oils and Fats Co., Ltd.; Cellosol 686, Cellosol 428, Cellosol 651-A, Cellosol A, H-803, B460, E-172, E-866, K-133, hydrin D-337 and E-139 from Chukyo Yushi Co., Ltd.; 125° paraffin, 125° FD, 130° paraffin, 135° paraffin, 135° H, 140° paraffin, 140° N, 145 paraffin and paraffin wax M from Nippon Oil Corporation), or a microcrystalline wax (for example, Hi-Mic-2095, Hi-Mic-3090, Hi-Mic-1080, Hi-Mic-1070, Hi-Mic-2065, Hi-Mic-1045, Hi-Mic-2045, EMUSTAR-0001 and EMUSTAR-042X from Nippon Oils and Fats Co., Ltd; Cellosol 967, M, from Chukyo Yushi Co., Ltd.; 155 Microwax and 180 Microwax from Nippon Oil Corporation), and petrolatum (for example, OX-1749, OX-0450, OX-0650B, OX-0153, OX-261BN, OX-0851, OX-0550, OX-0750B, JP-1500, JP-056R and JP-011P from Nippon Oils and Fats Co., Ltd.), and the like.

A content of the natural wax in the toner image-receiving layer (a surface) is preferably 0.1 $g/m^2$ to 4 $g/m^2$, and more preferably 0.2 $g/m^2$ to 2 $g/m^2$.

If the content is less than 0.1 $g/m^2$, the anti-offset properties and the adhesive resistance deteriorate. If the content is more than 4 $g/m^2$, the quality of an image may deteriorate because of the excessive amount of wax.

The melting point of the natural wax is preferably 70° C. to 95° C., and more preferably 75° C. to 90° C., from a viewpoint of anti-offset properties and paper transporting properties.

The matting agent can be selected from any known matting agent. Solid particles for use in the matting agents can be classified as inorganic particles (inorganic matting agents) and organic particles (organic matting agents).

Specifically, the inorganic matting agents may be oxides (for example, silicon dioxide, titanium oxide, magnesium oxide, aluminum oxide), alkaline earth metal salts (for example, barium sulfate, calcium carbonate, and magnesium sulfate), silver halides (for example, silver chloride, and silver bromide), glass, and the like.

Examples of the inorganic matting agents can be found, for example, in West German Patent No. 2529321, the U.K. Patent Nos. 760775, 1260772, and the U.S. Pat. Nos. 1,201,905, 2,192,241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245 and 4,029,504.

Materials of the organic matting agent include starch, cellulose ester (for example, cellulose-acetate propionate), cellulose ether (for example, ethyl cellulose) and a synthetic resin. It is preferred that the synthetic resin is insoluble or difficult to become solved. Examples of insoluble or difficult to become solved in synthetic resins include poly(meth) acrylic acid esters (for example, polyalkyl(meth)acrylate, polyalkoxyalkyl(meth)acrylate, polyglycidyl(meth)acrylate), poly(meth) acrylamide, polyvinyl ester (for example, polyvinyl acetate), polyacrylonitrile, polyolefins (for example, polyethylene), polystyrene, benzoguanamine resin, formaldehyde condensation polymer, epoxy resin, polyamide, polycarbonate, phenolic resin, polyvinyl carbazole, polyvinylidene chloride, and the like. Copolymers which combine the monomers used in the above polymers, may also be used.

In the case of the copolymers, a small amount of hydrophilic repeated units may be included. Examples of monomers which form a hydrophilic repeated unit include acrylic acid, methacrylic acid, a,p-unsaturated dicarboxylic acid, hydroxyalkyl(meth)acrylate, sulfoalkyl (meth)acrylate, styrene sulfonic acid, and the like.

Examples of the organic matting agents can be found, for example, in the U.K. Patent No. 1055713, the U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,379, 3,754,924 and 3,767,448, and JP-A Nos. 49-106821, and 57-14835.

Also, two or more types of solid particles may be used in conjunction as matting agents. The average particle size of the solid particles of the matting agent may suitably be, for example, 1 μm to 100 μm, and is more preferably 4 μm to 30 μm. The usage amount of the matting agent may suitably be 0.01 g/m² to 0.5 g/m², and is more preferably 0.02 g/m² to 0.3 g/m².

The releasing agents for use in the toner-image-receiving layer can also be derivatives, oxides, purified products, and mixtures of the aforementioned substances. These may also have reactive substituents.

The melting point (° C.) of the releasing agent is preferably 70° C. to 95° C., and more preferably 75° C. to 90° C., from the viewpoints of anti-offset properties and paper transport properties.

The releasing agent is also preferably a water-dispersible releasing agent, from the viewpoint of compatibility when a water-dispersible thermoplastic resin is used as the thermoplastic resin in the toner image-receiving layer.

The content of the releasing agent in the toner image-receiving layer is preferably 0.1% by mass to 10% by mass, more preferably 0.3% by mass to 8.0% by mass, and still more preferably 0.5% by mass to 5.0% by mass.

—Other Components—

Other components include various additives which are added in order to improve thermoplastic properties of a toner image-receiving layer, for example, a colorant, plasticizer, filler, cross-linking agent, electrification control agent, emulsifier, dispersant, and the like.

Examples of colorants include fluorescent whitening agents, white pigments, colored pigments, dyes, and the like.

The fluorescent whitening agent has absorption in the near-ultraviolet region, and is a compound which emits fluorescence at 400 nm to 500 nm. The various fluorescent whitening agent known in the art may be used without any particular limitation. Examples of the fluorescent whitening agent include the compounds described in "The Chemistry of Synthetic Dyes" Volume V, Chapter 8 edited by K. VeenRataraman. Specific examples of the fluorescent whitening agent include stilbene compounds, coumarin compounds, biphenyl compounds, benzo-oxazoline compounds, naphthalimide compounds, pyrazoline compounds, carbostyryl compounds, and the like. Examples of the commercial fluorescent whitening agents include WHITEX PSN, PHR, HCS, PCS, and B from Sumitomo Chemicals, UVITEX-OB from Ciba-Geigy, Co., Ltd., and the like.

Examples of the white pigments include the inorganic pigments (for example, titanium oxide, calcium carbonate, and the like).

Examples of the colored pigments include various pigments and azo pigments described in JP-A No. 63-44653, (for example, azo lakes such as carmine 6B and red 2B, insoluble azo compounds such as monoazo yellow, disazo yellow, pyrazolo orange, Balkan orange, and condensed azo compounds such as chromophthal yellow and chromophthal red), polycyclic pigments (for example, phthalocyanines such as copper phthalocyanine blue and copper phthalocyanine green), thioxadines such as thioxadine violet, isoindolinones such as isoindolinone yellow, surenes such as perylene, perinon, hulavanthoron and thioindigo, lake pigments (for example, malachite green, rhodamine B, rhodamine G and Victoria blue B), and inorganic pigment (for example, oxide, titanium dioxide, iron oxide red, sulfate; settling barium sulfate, carbonate; settling calcium carbonate, silicate; hydrous silicate, silicic anhydride, metal powder; aluminium powder, bronze powder, zinc powder, carbon black, chrome yellow, iron blue, or the like) and the like.

These may be used either alone, or in combination of two or more. Of these, titanium oxide is particularly preferred as the pigment.

There is no particular limitation on the form of the pigment. However, hollow particles are preferred from the viewpoint that they have excellent heat conductivity (low heat conductivity) during image fixing.

The various dyes including oil-soluble dyes, water-insoluble dyes, and the like may be used as the dye.

Examples of oil-soluble dyes include anthraquinone compounds, azo compounds, and the like.

Examples of water-insoluble dyes include vat dyes such as C.I.Vat violet 1, C.I.Vat violet 2, C.I.Vat violet 9, C.I.Vat violet 13, C.I.Vat violet 21, C.I.Vat blue 1, C.I.Vat blue 3, C.I.Vat blue 4, C.I.Vat blue 6, C.I.Vat blue 14, C.I.Vat blue 20 and C.I.Vat blue 35, or the like; disperse dyes such as C.I. disperse violet 1, C.I. disperse violet 4, C.I. disperse violet 10, C.I. disperse blue 3, C.I. disperse blue 7, C.I. disperse blue 58, or the like; and other dyes such as C. I. solvent violet 13, C.I. solvent violet 14, C.I. solvent violet 21, C.I. solvent violet 27, C.I. solvent blue 11, C.I. solvent blue 12, C.I. solvent blue 25, C.I. solvent blue 55, or the like.

Colored couplers used in silver halide photography may also be preferably used.

A content of the colorant in the toner image-receiving layer (surface) is preferably 0.1 g/m² to 8 g/m², and more preferably 0.5 g/m² to 5 g/m².

If the content of colorant is less than 0.1 g/m², the light transmittance in the toner image-receiving layer becomes high. If it is more than 8 g/m², handling becomes more difficult, due to crack and adhesive resistance.

In the colorant, an amount of the pigment to be added is, based on the mass of the thermoplastic resin which forms the toner image-receiving layer, less than 40% by mass, more preferably less than 30% by mass, and still more preferably less than 20% by mass.

The plasticizers known in the art may be used without any particular limitation. These plasticizers have the effect of adjusting the fluidity or softening of the toner image-receiving layer due to heat and/or pressure.

The plasticizer may be selected by referring to "Chemical Handbook," (Chemical Institute of Japan, Maruzen), "Plasticizers—their Theory and Application," (ed. Koichi Murai, Saiwai Shobo), "The Study of Plasticizers, Part 1" and "The Study of Plasticizers, Part 2" (Polymer Chemistry Association), or "Handbook of Rubber and Plastics Blending Agents" (ed. Rubber Digest Co.), or the like.

Examples of the plasticizers include phthalic esters, phosphate esters, aliphatic acid esters, abiethyne acid ester, abietic acid ester, sebacic acid esters, azelinic ester, benzoates, butylates, epoxy aliphatic acid esters, glycolic acid esters, propionic acid esters, trimellitic acid esters, citrates, sulfonates, carboxylates, succinic acid esters, maleates, fumaric acid esters, phthalic acid esters, stearic acid esters, and the like; amides (for example, aliphatic acid amides and sulfoamides); ethers; alcohols; lactones; polyethyleneoxy; and the like (See, for example, JP-A Nos. 59-83154, 59-178451, 59-178453, 59-178454, 59-178455, 59-178457, 62-174754, 62-245253, 61-209444, 61-200538, 62-8145, 62-9348, 62-30247, 62-136646, 62-174754, 62-245253, 61-209444, 61-200538, 62-8145, 62-9348, 62-30247, 62-136646 and 02-235694, and the like). The plasticizers can be mixed into a resin.

The plasticizers may be polymers having relatively low molecular weight. In this case, it is preferred that the molecular weight of the plasticizer is lower than the molecular weight of the binder resin to be plasticized. Preferably, plasticizers have a molecular weight of 15000 or less, or more preferably 5000 or less. When a polymer plasticizer is used as the plasticizer, the polymer of the polymer plasticizer is the same as that of the binder resin to be plasticized. For example, when the polyester resin is plasticized, polyester having low molecular weight is preferable. Further, oligomers may also be used as plasticizers. Apart from the compounds mentioned above, there are commercially products such as, for example, Adecasizer PN-170 and PN-1430 from Asahi Denka Co., Ltd.; PARAPLEX-G-25, G-30 and G-40 from C.P.Hall; and, rosin ester 8 L-JA, ester R-95, pentalin 4851, FK 115, 4820, 830, Ruizol 28-JA, Picolastic A75, Picotex LC and Cristalex 3085 from Rika Hercules, Inc, and the like.

The plasticizer can be used as desired to relax stress and distortion (physical distortions of elasticity and viscosity, and distortions of mass balance in molecules, binder main chains or pendant portions) which are produced when toners are embedded in the toner image-receiving layer.

The plasticizer may be dispersed in micro in the toner image-receiving layer. The plasticizer may also be dispersed in micro in a state of sea-island, in the toner image-receiving layer. The plasticizer may present in the toner image-receiving layer in a state of sufficiently mixed with other components such as binder or the like.

The content of plasticizer in the toner image-receiving layer is preferably 0.001% by mass to 90% by mass, more preferably 0.1% by mass to 60% by mass, and still more preferably 1% by mass to 40% by mass.

The plasticizer may be used for the purpose of adjusting slidability (improvement of transportability by reducing friction), improving fixing part offset (release of toner or layer to the fixing part), adjusting electrification (formation of a toner electrostatic image), and the like.

The filler may be an organic or inorganic filler. Reinforcers for binder resins, bulking agents and reinforcements known in the art may be used.

The filler may be one of those described in "Handbook of Rubber and Plastics Additives" (ed. Rubber Digest Co.), "Plastics Blending Agents—Basics and Applications" (New Edition) (Taisei Co.), "The Filler Handbook" (Taisei Co.), or the like.

As the filler, various inorganic fillers (or pigments) can be used. Examples of inorganic pigments include silica, alumina, titanium dioxide, zinc oxide, zirconium oxide, micaceous iron oxide, white lead, lead oxide, cobalt oxide, strontium chromate, molybdenum pigments, smectite, magnesium oxide, calcium oxide, calcium carbonate, mullite, and the like. Silica and alumina are particularly preferred. These fillers may be used either alone or in combination of two or more. It is preferred that the filler has a small particle diameter. If the particle diameter is large, the surface of the toner image-receiving layer may tend to become rough.

Examples of the silica include spherical silica and amorphous silica. The silica may be synthesized by the dry method, wet method or aerogel method. The surface of the hydrophobic silica particles may also be treated by trimethylsilyl groups or silicone. Colloidal silica is preferred. The average particle diameter of the silica is preferably 4 nm to 120 nm, and more preferably 4 nm to 90 nm.

The silica is preferably porous. The average pore size of porous silica is preferably 50 nm to 500 nm. The average pore volume per mass of porous silica is preferably 0.5 ml/g to 3 ml/g, for example.

The alumina includes anhydrous alumina and hydrated alumina. Examples of crystallized anhydrous aluminas which may be used, are α, β, γ, δ, ζ, η, θ, κ, ρ, or χ. Hydrated alumina is preferred to anhydrous alumina. The hydrated alumina may be a monohydrate or trihydrate. Monohydrates include pseudo-boehmite, boehmite and diaspore. Trihydrates include gibbsite and bayerite. The average particle diameter of alumina is preferably 4 nm to 300 nm, and more preferably 4 nm to 200 nm. Porous alumina is preferred. The average pore size of porous alumina is preferably 50 nm to 500 nm. The average pore volume per mass of porous alumina is around 0.3 ml/g to 3 ml/g.

The alumina hydrate can be synthesized by the sol-gel method, in which ammonia is added to an aluminum salt solution to precipitate alumina, or by hydrolysis of an alkali aluminate. Anhydrous alumina can be obtained by dehydrating alumina hydrate by the action of heat.

The filler is preferably from 5 parts by mass to 2000 parts by mass relative to 100 parts of the dry mass of the binder of a layer to which it is added.

A crosslinking agent can be added in order to adjust the storage stability or thermoplastic properties of the toner image-receiving layer. Examples of the crosslinking agent include compounds containing two or more reactive groups in the molecule, such as an epoxy group, an isocyanate group, an aldehyde group, an active halogen group, an active methylene group, an acetylene group and other reactive groups known in the art.

The cross-linking agent may also be a compound having two or more groups capable of forming bonds such as hydrogen bonds, ionic bonds, stereochemical bonds, or the like.

The cross-linking agent may be a compound known in the art such as a coupling agent for resin, curing agent, polymerizing agent, polymerization promoter, coagulant, film-forming agent, film-forming assistant, or the like. Examples of the coupling agents include chlorosilanes, vinylsilanes, epoxysilanes, aminosilanes, alkoxyaluminum chelates, titanate coupling agents, and the like. The examples further include other agents known in the art such as those mentioned in Handbook of Rubber and Plastics Additives (ed. Rubber Digest Co.).

The charge control agent preferably adjusts transfer and adhesion of toner, and prevents charge adhesion of a toner image-receiving layer.

The charge control agent may be any charge control agent known in the art. Examples of the charge control agent include surfactants such as a cationic surfactant, an anionic surfactant, an amphoteric surfactant, a nonionic surfactant, or the like; polymer electrolytes, electroconducting metal oxides, and the like.

Examples of the surfactant include cationic charge inhibitors such as quaternary ammonium salts, polyamine derivatives, cation-modified polymethylmethacrylate, cation-modified polystyrene, or the like; anionic charge inhibitors such as alkyl phosphates, anionic polymers, or the like; and nonionic charge inhibitors such as aliphatic ester, polyethylene oxide, or the like. When the toner has a negative charge, cationic charge control agent and nonionic charge control agent, for example, are preferable.

Examples of the electroconducting metal oxides include $ZnO$, $TiO_2$, $SnO_2$, $Al_2O_3$, $In_2O_3$, $SiO_2$, $MgO$, $BaO$, $MoO_3$, and the like. These may be used alone, or in combination of two or more.

Moreover, the metal oxide may contain other elements. For example, $ZnO$ may contain Al, In, or the like, $TiO_2$ may contain Nb, Ta, or the like, and $SnO_2$ may contain (or, dope) Sb, Nb, halogen elements, or the like.

The materials used to obtain the toner image-receiving layer may also contain various additives to improve image stability when output, or to improve stability of the toner image-receiving layer itself. Examples of the additives include antioxidants, age resistors, degradation inhibitors, anti-ozone degradation inhibitors, ultraviolet ray absorbers, metal complexes, light stabilizers, preservatives, fungicide, and the like.

Examples of the antioxidants include chroman compounds, coumarane compounds, phenol compounds (for example, hindered phenols), hydroquinone derivatives, hindered amine derivatives, spiroindan compounds, and the like. The antioxidants can be found, for example, in JP-A No. 61-159644.

Examples of age resistors include those found in Handbook of Rubber and Plastics Additives, Second Edition (1993, Rubber Digest Co.), pp. 76-121.

Examples of the ultraviolet ray absorbers include benzotriazo compounds (described in the U.S. Pat. No. 3,533, 794), 4-thiazolidone compounds (described in the U.S. Pat. No. 3,352,681), benzophenone compounds (described in JP-A No. 46-2784), ultraviolet ray absorbing polymers (described in JP-A No. 62-260152).

Examples of the metal complex include those described in U.S. Pat. Nos. 4,241,155, 4,245,018, 4,254,195, JP-A Nos. 61-88256, 62-174741, 63-199248, 01-75568, 01-74272, and the like.

Additives for photography known in the art may also be added to the material used to obtain the toner image-receiving layer as described above. Examples of the photographic additives can be found in the Journal of Research Disclosure (hereinafter referred to as RD) No. 17643 (December 1978), No. 18716 (November 1979) and No. 307105 (November 1989). The relevant sections are shown.

| Type of additive | RD17643 | RD18716 | RD307105 |
|---|---|---|---|
| 1. Whitener | p.24 | p.648 right column | p.868 |
| 2. Stabilizer | pp.24-25 | p.649 right column | pp.868-870 |
| 3. Light absorber (Ultraviolet ray absorber) | pp.25-26 | p.649 right column | pp.873 |
| 4. Colorant image stabilizer | p.25 | p.650 right column | p.872 |
| 5. Film hardener | p.26 | p.651 left column | p.874-875 |
| 6. Binder | p.26 | p.651 left column | p.873-874 |
| 7. Plasticizer, lubricant | p.27 | p.650 right column | p.876 |
| 8. Auxiliary application agent (Surfactant) | pp.26-27 | p.650 right column | pp.875-876 |
| 9. Antistatic agent | p.27 | p.650 right column | p.876-877 |
| 10. Matting agent | | | pp.878-879 |

The toner image-receiving layer of the present invention is formed by applying a coating solution which contains the polymer used for the toner image-receiving layer with a wire coater or the like onto the support, and drying the coating solution. The coating solution is prepared by dissolving or uniformly dispersing an additive such as a thermoplastic polymer, a plasticizer, or the like, into an organic solvent such as alcohol, ketone, or the like. The organic solvent used here may be for example methanol, isopropyl alcohol, methyl ethyl ketone, or the like. If the polymer used for the toner image-receiving layer is water-soluble, the toner image-receiving layer can be prepared by applying an aqueous solution of the polymer onto the support. Polymers which are not water-soluble may be applied onto the support in an aqueous dispersion.

The film-forming temperature of the polymer used in the present invention is preferably room temperature or higher, from the viewpoint of pre-print storage, and preferably 100° C. or lower, from the viewpoint of fixing toner particles.

The toner image-receiving layer of the present invention is coated so that the amount of coating in mass after drying is preferably 1 g/m² to 20 g/m², and more preferably 4 g/m² to 15 g/m².

There is no particular limitation on the thickness of the toner image-receiving layer. However, it is preferably 1 μm to 30 μm, and more preferably 2 μm to 20 μm.

—Physical Properties of Toner Image-receiving Layer—

The 180° separation strength of the toner image-receiving layer at the fixing temperature by the fixing member is preferably 0.1 N/25 mm or less, and more preferably 0.041 N/25 mm or less. The 180° separation strength can be measured based on the method described in JIS K6887 using the surface material of the fixing member.

It is preferred that the toner image-receiving layer has a high degree of whiteness. This whiteness is measured by the method specified in JIS P 8123, and is preferably 85% or more. It is preferred that the spectral reflectance is 85% or more in the wavelength of 440 nm to 640 nm, and that the difference between the maximum spectral reflectance and minimum spectral reflectance in this wavelength is within 5%. Further, it is preferred that the spectral reflectance is 85% or more in the wavelength of 400 nm to 700 nm, and that the difference between the maximum spectral reflectance and the minimum spectral reflectance in the wavelength is within 5%.

Specifically, for the whiteness, the value of L* is preferably 80 or higher, more preferably 85 or higher, and still more preferably 90 or higher in a CIE 1976 (L*a*b*) color space. The color tint of the white color is preferably as neutral as possible. Regarding the color tint of the whiteness, the value of $(a*)^2+(b*)^2$ is preferably 50 or less, more preferably 18 or less and still more preferably 5 or less in a (L*a*b*) space.

It is preferred that the toner image-receiving layer has a high surface gloss. The 45° gloss luster is preferably 60 or higher, more preferably 75 or higher, and still more preferably 90 or higher, over the whole range from white where there is no toner, to black where toner is densed at maximum.

However, the gloss luster is preferably 110 or less. If it is more than 110, the image has a metallic appearance which is undesirable.

Gloss luster may be measured by JIS Z 8741.

It is preferred that the toner image-receiving layer has a high smoothness. The arithmetic average roughness (Ra) is preferably 3 μm or less, more preferably 1 μm or less, and still more preferably 0.5 μm or less, over the whole range from white where there is no toner, to black where toner is densed at maximum.

Arithmetic average roughness may be measured by JIS B 0601, B 0651, and B 0652.

It is preferred that the toner image-receiving layer has one of the following physical properties, more preferred that it has several of the following physical properties, and most preferred that it has all of the following physical properties.

(1) $T_m$ (Melting temperature) of the toner image-receiving layer is 30° C. or more, and equal to or less than $T_m+20°$ C. of the toner.

(2) The temperature at which the viscosity of the toner image-receiving layer is $1\times10^5$ cp is 40° C. or higher, lower than the corresponding temperature for the toner.
(3) At a fixing temperature of the toner image-receiving layer, the storage elasticity modulus (G') is $1\times10^2$ Pa to $1\times10^5$ Pa, and the loss elasticity modulus (G") is $1\times10^2$ Pa to $1\times10^5$ Pa.
(4) The loss tangent (G"/G'), which is the ratio of the loss elasticity modulus (G") and the storage elasticity modulus (G') at a fixing temperature of the toner image-receiving layer, is 0.01 to 10.
(5) The storage modulus (G') at a fixing temperature of the toner image-receiving layer is minus 50 to plus 2500, relative to the storage elasticity modulus (G") at a fixing temperature of the toner.
(6) The inclination angle on the toner image-receiving layer of the molten toner is 50° or less, and particularly preferably 40° or less.

The toner image-receiving layer preferably satisfies the physical properties described in Japanese Patent No. 2788358, and JP-A Nos. 07-248637, 08-305067 and 10-239889.

It is preferred that the surface electrical resistance of the toner image-receiving layer is $1\times10^6$ Ω/cm² to $1\times10^{15}$ Ω/cm² (under conditions of 25° C., 65% RH).

If the surface electrical resistance is less than $1\times10^6$ Ω/cm², the toner amount transferred to the toner image-receiving layer is insufficient, and the density of the toner image obtained may be too low. On the other hand, if the surface electrical resistance is more than $1\times10^{15}$ Ω/cm², more charge than necessary is produced during transfer. Therefore, toner is transferred insufficiently, image density is low and static electricity develops causing dust to adhere during handling of the electrophotographic image-receiving sheet, or misfeed, overfeed, discharge marks or toner transfer dropout may occur.

The surface electrical resistance of the surface on the opposite surface of the support to the toner image-receiving layer is preferably $5\times10^8$ Ω/cm² to $3.2\times10^{10}$ Ω/cm², and more preferably $1\times10^9$ Ω/cm² to $1\times10^{10}$ Ω/cm².

For the present invention, the surface resistivities are measured based on JIS K 6911. The sample is left with air-conditioning for 8 hours or more at a temperature of 20° C. and the humidity of 65%. Measurements are made using an R8340 produced by Advantest Ltd., under the same environmental conditions after giving an electric current for 1 minute at an applied voltage of 100V.

[Other Layers]

Other layers may include, for example, a surface protective layer, backing layer, contact improving layer, intermediate layer, undercoat, cushion layer, charge control (inhibiting) layer, reflecting layer, tint adjusting layer, storage ability improving layer, anti-adhering layer, anti-curl layer, smoothing layer, and the like. These layers may have a single-layer structure or may be formed of two or more layers.

A surface protective layer may be disposed on the surface of the toner image-receiving layer to protect the surface of the electrophotographic image-receiving sheet, to improve storage properties, to improve ease of handling, to facilitate writing, to improve paper transporting properties within an equipment, to confer anti-offset properties, or the like. The surface protective layer may comprise one layer, or two or more layers. In the surface protective layer, various thermoplastic resins or thermosetting resins may be used as binders, and are preferably the same types of resins as those of the toner image-receiving layer. However, the thermodynamic properties and electrostatic properties are not necessarily identical to those of the toner image-receiving layer, and may be individually optimized.

The surface protective layer may comprise the various additives described above which can be used for the toner image-receiving layer. In particular, in addition to the releasing agents for the present invention, the surface protective layer may include other additives, for example matting agents or the like. The matting agents may be any of these used in the related art.

From the viewpoint of fixing properties, it is preferred that the outermost surface layer of the electrophotographic image-receiving sheet (which refers to, for example, the surface protective layer, if disposed) has good compatibility with the toner. Specifically, it is preferred that the contact angle with molten toner is, for example, from 0° to 40°.

It is preferred that, in the electrophotographic image-receiving sheet, a backing layer is disposed on the opposite surface to the surface on which the support is disposed, in order to confer back surface output compatibility, and to improve back surface output image quality, curl balance and paper transporting properties within equipment.

There is no particular limitation on the color of the backing layer. However, if the electrophotographic image-receiving sheet of the invention is a double-sided output image-receiving sheet where an image is formed also on the back surface, it is preferred that the backing layer is also white. It is preferred that the whiteness and spectral reflectance are 85% or more, for both the top surface and the back surface.

To improve double-sided output compatibility, the backing layer may have an identical structure to that of the toner image-receiving layer. The backing layer may comprise the various additives described hereintofore. Of these additives, matting agents and charge control agents are particularly suitable. The backing layer may be a single layer, or may have a laminated structure comprising two or more layers.

Further, if releasing oil is used for the fixing roller or the like, to prevent offset during fixing, the backing layer may have oil absorbing properties.

In the electrostatic image-receiving sheet, it is preferred to dispose a contact improving layer in order to improve the contact between the support and the toner image-receiving layer. The contact improving layer may contain the various additives described above. Of these, cross-linking agents are particularly preferred to be blended in the contact improving layer. Furthermore, to improve accepting properties to toner, it is preferred that the electrophotographic image-receiving sheet further comprises a cushion layer between the contact improving layer and the toner image-receiving layer.

An intermediate layer may for example be disposed between the support and a contact improvement layer, between a contact improvement layer and a cushion layer, between a cushion layer and a toner image-receiving layer, or between a toner image-receiving layer and a storage property improvement layer. In the case of an electrophotographic image-receiving sheet comprising a support, a toner image-receiving layer and an intermediate layer, the intermediate layer may of course be disposed for example between the support and the toner image-receiving layer.

The thickness of the electrophotographic image-receiving sheet of the present invention can be suitably selected according to the purpose without particular limitation. The thickness is preferably 50 μm to 350 μm, and more preferably 100 μm to 280 μm.

<Toner>

In the electrophotographic image-receiving sheet, the toner image-receiving layer receives toners during printing or copying.

The toner contains at least a binder resin and a colorant, but may contain releasing agents and other components, if necessary.

—Binder Resin for Toner—

Examples of the binder resin include vinyl monopolymer of: styrenes such as styrene, parachlorostyrene, or the like; vinyl esters such as vinyl naphthalene, vinyl chloride, vinyl bromide, vinyl fluoride, vinyl acetate, vinyl propioniate, vinyl benzoate, vinyl butyrate, or the like; methylene aliphatic carboxylates such as methyl acrylate, ethyl acrylate, n-butyl acrylate, isobutyl acrylate, dodecyl acrylate, n-octyl acrylate, 2-chloroethyl acrylate, phenyl acrylate, α-methyl chloroacrylate, methyl methacrylate, ethyl methacrylate, butyl acrylate, or the like; vinyl nitriles such as acryloniotrile, methacrylonitrile, acrylamide, or the like; vinyl ethers such as vinyl methyl ether, vinyl ethyl ether, vinyl isobutyl ether, or the like; N-vinyl compounds such as N-vinyl pyrrole, N-vinylcarbazole, N-vinyl indole, N-vinyl pyrrolidone, or the like; and vinyl carboxylic acids such as methacrylic acid, acrylic acid, cinnamic acid, or the like. These vinyl monomers may be used either alone, or copolymers thereof may be used. Further, various polyesters may be used, and various waxes may be used in combination.

Of these resins, it is preferable to use a resin of the same type as the resin used for the toner image-receiving layer of the present invention.

—Colorants for the Toner—

The colorants generally used in the art can be used without limitation. Examples of the colorants include various pigments such as carbon black, chrome yellow, Hansa yellow, benzidine yellow, threne yellow, quinoline yellow, permanent orange GTR, pyrazolone orange, Balkan orange, watch young red, permanent red, brilliant carmin 3B, brilliant carmin 6B, dippon oil red, pyrazolone red, lithol red, rhodamine B lake, lake red C, rose bengal, aniline blue, ultramarine blue, chalco oil blue, methylene blue chloride, phthalocyanine blue, phthalocyanine green, malachite green oxalate, or the like. Various dyes may also be added such as acridine, xanthene, azo, benzoquinone, azine, anthraquinone, thioindigo, dioxadine, thiadine, azomethine, indigo, thioindigo, phthalocyanine, aniline black, polymethine, triphenylmethane, diphenylmethane, thiazine, thiazole, xanthene, or the like. These colorants may be used either alone, or in combination of a plurality of colorants.

It is preferred that the content of the colorant is 2% by mass to 8% by mass. If the content of colorant is 2% by mass or more, the coloration does not become weaker. If it is 8% by mass or less, transparency does not deteriorate.

—Releasing Agent for the Toner—

The releasing agent may be in principle any of the wax known in the art. Polar wax containing nitrogen such as highly crystalline polyethylene wax having relatively low molecular weight, Fischertropsch wax, amide wax, urethane wax, and the like are particularly effective. For polyethylene wax, it is particularly effective if the molecular weight is 1000 or less, and is effective more preferably if the molecular weight is 300 to 1000.

Compounds containing urethane bonds have a solid state due to the strength of the cohesive force of the polar groups even if the molecular weight is low, and as the melting point can be set high in view of the molecular weight, they are suitable. The preferred molecular weight is 300 to 1000. The initial materials may be selected from various combinations such as a diisocyane acid compound with a mono-alcohol, a monoisocyanic acid with a mono-alcohol, dialcohol with mono-isocyanic acid, tri-alcohol with a monoisocyanic acid, and a triisocyanic acid compound with mono-alcohol. However, in order to prevent the molecular weight from becoming too large, it is preferable to combine a compound having multiple functional groups with another compound having one functional group, and it is important that the amount of functional groups be equivalent.

Among the initial materials, examples of the monoisocyanic acid compounds include dodecyl isocyanate, phenyl isocyanate and derivatives thereof, naphthyl isocyanate, hexyl isocyanate, benzyl isocyanate, butyl isocyanate, allyl isocyanate, and the like.

Examples of the diisocyanic acid compounds include tolylene diisocyanate, 4'-diphenylmethane diisocyanate, toluene diisocyanate, 1,3-phenylene diisocyanate, hexamethylene diisocyanate, 4-methyl-m-phenylene diisocyanate, isophorone diisocyanate, and the like.

Examples of the mono-alcohol include ordinary alcohols such as methanol, ethanol, propanol, butanol, pentanol, hexanol, heptanol, and the like.

Among the initial materials, examples of the di-alcohols include numerous glycols such as ethylene glycol, diethylene glycol, triethylene glycol, trimethylene glycol, or the like; and examples of the tri-alcohols include trimethylol propane, triethylol propane, trimethanolethane, and the like. The present invention is not necessarily limited these examples, however.

These urethane compounds may be mixed with the resin or the colorant during kneading, as an ordinary releasing agent, and used also as a kneaded-crushed toner. Further, in a case of using an emulsion polymerization cohesion scorification toner, the urethane compounds may be dispersed in water together with an ionic surfactant, polymer acid or polymer electrolyte such as a polymer base, heated above the melting point, and converted to fine particles by applying an intense shear in a homogenizer or pressure discharge dispersion machine to manufacture a releasing agent particle dispersion of 1 im or less, which can be used together with a resin particle dispersion, colorant dispersion, or the like.

—Toner, other Components—

The toner of the present invention may also contain other components such as internal additives, charge control agents, inorganic particles, or the like. Examples of the internal additives include metals such as ferrite, magnetite, reduced iron, cobalt, nickel, manganese, or the like; alloys or magnets such as compounds containing these metals.

Examples of the charge control agents include dyes such as quaternary ammonium salt, nigrosine compounds, dyes made from complexes of aluminum, iron and chromium, or triphenylmethane pigments. The charge control agent can be selected from the ordinary charge control agent. Materials which are difficult to become solved in water are preferred from the viewpoint of controlling ionic strength which affects cohesion and stability during melting, and the viewpoint of less waste water pollution.

The inorganic fine particles may be any of the external additives for toner surfaces generally used, such as silica, alumina, titania, calcium carbonate, magnesium carbonate, tricalcium phosphate, or the like. It is preferred to disperse these with an ionic surfactant, polymer acid or polymer base.

Surfactants can also be used for emulsion polymerization, seed polymerization, pigment dispersion, resin particle dispersion, releasing agent dispersion, cohesion or stabilization thereof. For example, it is effective to use, in combination, anionic surfactants such as sulfuric acid ester salts, sulfonic acid salts, phosphoric acid esters, soaps, or the like; cationic surfactants such as amine salts, quaternary ammonium salts, or the like; or non-ionic surfactants such as polyethylene glycols, alkylphenol ethylene oxide adducts, polybasic alcohols, or the like. These may generally be dispersed by a rotary shear homogenizer or a ball mill, sand mill, dyno mill, or the like, all of which contain the media.

The toner may also contain an external additive, if necessary. Examples of the external additive include inorganic powder, organic particles, and the like. Examples of the inorganic particles include $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, CaO. $SiO_2$, $K_2O \cdot (TiO_2)_n$, $Al_2O_3 \cdot 2SiO_2$, $CaCO_3$, $MgCO_3$, $BaSO_4$, $MgSO_4$, and the like. Examples of the organic particles include aliphatic acids, derivatives thereof, and the like, powdered metal salts thereof, and resin powders such as fluorine resin, polyethylene resin, acrylic resin, or the like. The average particle diameter of the powder may be, for example, 0.01 µm to 5 µm, and is more preferably 0.1 µm to 2 µm.

There is no particular limitation on the process of manufacturing the toner, but it is preferably manufactured by a process comprising the steps of (i) forming cohesive particles in a dispersion of resin particles to manufacture a cohesive particle dispersion, (ii) adding a fine particle dispersion to the cohesive particle dispersion so that the fine particles adhere to the cohesive particles, thus forming adhesion particles, and (iii) heating the adhesion particles which melt to form toner particles.

—Physical Properties for Toner—

It is preferred that the volume average particle diameter of the toner of the present invention is from 0.5 µm to 10 µm.

If the volume average particle diameter of the toner is too small, it may have an adverse effect on handling of the toner (supplementation, cleaning properties, fluidability, or the like), and productivity of the particles may deteriorate. On the other hand, if the volume average particle diameter is too large, it may have an adverse effect on image quality and resolution, both of which lead to granulariness and transferring properties.

It is preferred that the toner of the present invention satisfies the above volume average particle diameter range, and that the volume average particle distribution index (GSDv) is 1.3 or less.

It is preferred that the ratio (GSDv/GSDn) of the volume average polymer distribution index (GSDv) and the number average particle distribution index (GSDn) is 0.95 or more.

It is preferred that the toner of the present invention satisfies the volume average particle diameter range, and that the average value of the shape factor expressed by the following equation is 1.00 to 1.50:

Shape factor=$(\Pi \times L^2)/(4 \times S)$ (Where "L" represents the length of the toner particle and "S" represents the projected area of the toner particle.)

If the toner satisfies the above conditions, it has a desirable effect on image quality, and in particular, on granulariness and resolution. Also, there is less risk of dropout and blur accompanying with toner transferring, and less risk of adverse effect on handling properties, even if the average particle diameter is not small.

The storage elasticity modulus G' (measured at an angular frequency of 10 rad/sec) of the toner itself at 150° C. is 10 Pa to 200 Pa, which is suitable for improving image quality and preventing offset at a fixing step.

<Belt-fixing Smoothing Device>

The belt fixing and smoothing device of an image forming apparatus constituting the electrophotographic printing system of the present invention comprises a heating and pressuring member, a belt member, a cooling device, and a cooling and separating unit and may further comprise other members according to necessity.

The heating and pressuring member is not particularly limited. Examples thereof include a combination of a heating roller, a pressuring roller, and an endless belt. The cooling device is not particularly limited. Examples thereof include a cooling device which can blow cool air and adjust cooling temperature, a heat sink, and the like.

The cooling and separating unit is not particularly limited, and it may suitably be selected according to the purpose. It typically has a spot near a tension roller where an electrophotographic image-receiving sheet separates from a belt by rigidity (elasticity) of the sheet itself.

When the electrophotographic image-receiving sheet is brought into contact with the heating and pressuring member of the belt fixing and smoothing device, it is preferably pressurized. The sheet can be pressurized by any technique and is preferably pressurized by the application of a nip pressure. The nip pressure is preferably from 1 to 100 kgf/cm$^2$ and more preferably form 5 to 30 kgf/cm$^2$ for the formation of images with excellent water resistance, high surface smoothness and good gloss. The heating temperature in the hot-pressing member is equal to or higher than the softening point of the thermoplastic resin in the image-forming layer (toner-image-receiving layer), depends on the type of the thermoplastic resin but is generally preferably from 80° C. to 200° C. The cooling temperature in the cooling device is preferably 80° C. or lower and more preferably from 20° C. to 80° C. for the sufficient solidification of the thermoplastic resin layer in the toner-image-receiving layer.

The belt member in the belt fixing and smoothing device comprises a heat-resistant support film and a releasing layer arranged on the support film.

The support film is not specifically limited, as long as it has heat resistance, and is, for example, a film of a polyimide (PI), a poly(ethylene naphthalate) (PEN), a poly(ethylene terephthalate) (PET), a poly(ether ether ketone) (PEEK), a poly(ether sulfone) (PES), a poly(ether imide) (PEI), or a poly(parabanic acid) (PPA).

The releasing layer preferably comprises at least one of silicone rubbers, fluorocarbon rubbers, fluorocarbonsiloxane rubbers, silicone reins, and fluorocarbon resins. The belt member more preferably has a layer comprising a fluorocarbonsiloxane rubber on its surface, and further preferably has a layer comprising a silicone rubber on its surface, which silicone rubber layer has a layer comprising a fluorocarbonsiloxane rubber on its surface.

The belt fixing method may for example be the oilless apparatus for electrophotography as described in JP-A No. 11-352819, or the method where a secondary transfer and fixing are realized simultaneously as described in JP-A Nos. 11-231671 and 05-341666. An apparatus for electrophotography having a fixing belt according to the present invention may be an apparatus for electrophotography including for example at least a heating and pressurizing part which can melt and pressurize the toner, a fixing belt which can transport an image-receiving material with adhering toner while in contact with the toner image-receiving layer, and a cooling part which can cool the heated image-receiving material while it is still adhering to the fixing belt. By using the electrophotographic image-receiving material having the toner image-receiving layer in the apparatus for electrophotography which includes the fixing belt, toner adhering to the toner image-receiving layer is fixed in fine detail without spreading onto the image-receiving material, and the molten toner is cooled and solidified, while adhering closely to the fixing belt. In this way, the toner is received onto the electrophotographic image-receiving sheet with completely embedded in the toner image-receiving layer. Therefore, there are no image discrepancies, and a glossy and smooth toner image is obtained.

The electrophotographic image-receiving sheet of the present invention is particularly suitable for forming an image by the oilless belt fixing method, and it permits a large improvement of offset. However, other methods for forming an image may also likewise be used.

For example, by using the electrophotographic image-receiving sheet of the present invention, a full-color image can easily be formed while improving image quality and preventing cracks. A full-color image can be formed using an apparatus for electrophotography capable of forming full-color images. An ordinary apparatus for electrophotography includes an image-receiving paper transporting part, latent image-forming part, and developing part disposed in the vicinity of the latent image-forming part.

To improve image quality, adhesive transfer or heat assistance transfer may be used instead of the electrostatic transfer or bias roller transfer, or in combination therewith. Specific details of these methods are given for example in JP-A Nos. 63-113576 and 05-341666. It is particularly preferred to use an intermediate transfer belt in the heat assistance transfer method. Also, it is preferred to provide a cooling device for the intermediate belt after toner transfer or in the latter half of the toner transfer to the electrophotographic image-receiving sheet. Due to this cooling device, the toner (toner image) is cooled to the softening point of the binder resin or lower, or the glass transition temperature of the toner or less, hence the image is transferred to the electrophotographic image-receiving sheet efficiently and can be separated away from the intermediate transfer belt.

The fixing is an important step that influences the glossiness and the smoothness of the toner image in a final state. The fixing method may be carried out by a heating and pressurizing roller, or belt fixing using a belt, but from the viewpoint of image quality such as gloss and smoothness, belt fixing is preferred. Belt fixing methods known in the art include for example an oil-less belt fixing described in JP-A No. 11-352819, and the method where secondary transfer and fixing are realized simultaneously as described in JP-A Nos. 11-231671 and 05-341666. Further, a primary fixing may also be performed by a heat roller before the heating and pressurizing by the fixing belt and fixing roller.

FIG. 1 is an example of the belt fixing and smoothing device. In the belt fixing and smoothing device (endless press) of cooling and releasing system, a processing section 201 includes a belt 202, a heating roller 203, a pressure roller 204, tension rollers 205, a cleaning roller 206, a cooling device 207, and conveying rollers 208.

The belt 202 and a pair of the tension rollers 205 are arranged inside the belt 202.

The belt 202 is rotatably mounted around the heating roller 203 and the pair of tension rollers 205 which are placed apart from the heating roller 203. The pressuring roller 204 is arranged so as to be in contact with the belt 202 and opposing the heating roller 203. Between the pressuring roller 204 and the belt 202 is a nip portion where the pressuring roller 204 and the heating roller 203 apply pressure.

The cooling device 207 is arranged on the inner side of the belt 202, and in relation to the rotating direction of the belt 202, between the heating roller 203 positioned upstream and the tension rollers 205 positioned downstream.

For the transporting rollers 208, two of them are arranged so as to oppose the cooling device 207 through the belt 202.

Here, the space between the two transporting rollers 208 is substantially the same distance as the distance between the nip portion and one of the transporting rollers 208 and the distance between the tension roller 205 and the other transporting roller 208. The cleaning roller 206 is arranged so as to oppose the heating roller 203 through the belt 202 on the opposite side of where the pressuring roller 204 is opposing the heating roller 3. The cleaning roller 206 and the heating roller 203 apply pressure to a portion between the cleaning roller 206 and the belt 202. The heating roller 203, pressuring roller 204, tension roller 205, cleaning roller 206, and transporting rollers 208 rotate in combination with one another so as to rotate the belt 202.

The belt member for use in the image forming apparatus comprises a heat-resistant support film and a releasing layer arranged on the support film.

The support film is not specifically limited, as long as it has heat resistance, and is, for example, a film of a polyimide (PI), a poly(ethylene naphthalate) (PEN), a poly(ethylene terephthalate) (PET), a poly(ether ether ketone) (PEEK), a poly(ether sulfone) (PES), a poly(ether imide) (PEI), a poly(parabanic acid) (PPA), an electrocast nickel, and an aluminum.

The releasing layer preferably comprises at least one of silicone rubbers, fluorocarbon rubbers, fluorocarbonsiloxane rubbers, silicone reins, and fluorocarbon resins. The belt member more preferably has a layer comprising a fluorocarbonsiloxane rubber on its surface, and further preferably has a layer comprising a silicone rubber on its surface, which silicone rubber layer has a layer comprising a fluorocarbonsiloxane rubber on its surface.

It is preferred that the fluorocarbon siloxane rubber has at least one of a perfluoroalkyl ether group and a perfluoroalkyl group in a main chain thereof.

For the fluorocarbon siloxane rubber, a cured product of fluorocarbon siloxane rubber composition which contains components of (A) to (D) is preferable.

(A) a fluorocarbon polymer having a fluorocarbon siloxane expressed by the following General Formula 1 as its main component, and containing aliphatic unsaturated groups, (B) an organopolysiloxane and/or fluorocarbon siloxane containing two or more SiH groups in one molecule, and 1 to 4 times more the molar amount of SiH groups than the amount of aliphatic unsaturated groups in the fluorocarbon siloxane rubber, (C) a filler, and (D) an effective amount of catalyst; and the like.

The fluorocarbon polymer having (A) as a component comprises a fluorocarbon siloxane containing a repeated unit expressed by the following General Formula 1 as its main component, and contains aliphatic unsaturated groups.

General Formula 1

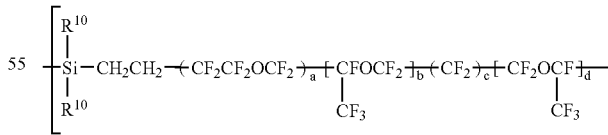

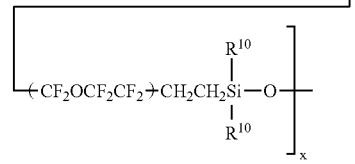

Herein, in the General Formula 1, $R^{10}$ is a non-substituted or substituted monofunctional hydrocarbon group preferably containing 1 to 8 carbon atoms, preferably an alkyl group containing 1 to 8 carbon atoms or an alkenyl group containing 2 to 3 carbon atoms, and particularly preferably a methyl group. "a" and "e" are respectively an integer of 0 or 1; "b" and "d" are respectively an integer of 1 to 4, and "c" is an integer of 0 to 8. "x" is an integer of 1 or more, and preferably 10 to 30.

An example of this component (A) include a substance expressed by the following General Formula 2:

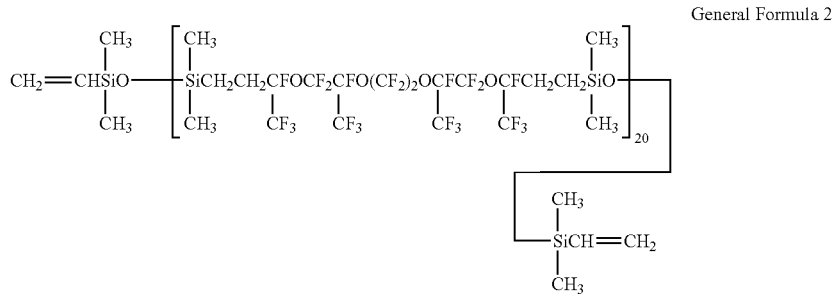

General Formula 2

In Component (B), one example of the organopolysiloxane comprising SiH groups is an organohydrogenpolysiloxane having at least two hydrogen atoms bonded to silicon atoms in the molecule.

In the fluorocarbon siloxane rubber composition, when the organocarbon polymer of Component (A) comprises an aliphatic unsaturated group, the organohydrogenpolysiloxane is preferably used as the curing agent. Namely, in this case, the cured product is formed by an addition reaction between aliphatic unsaturated groups in the fluorocarbon siloxane, and hydrogen atoms bonded to silicon atoms in the organohydrogenpolysiloxane.

Examples of these organohydrogenpolysiloxanes include the various organohydrogenpolysiloxanes used in an addition-curing silicone rubber composition.

It is generally preferred that, in the organohydrogenpolysiloxane, the number of "SiH groups" therein is one or more, and particularly 1 to 5, relative to one aliphatic unsaturated hydrocarbon group in the fluorocarbon siloxane of Component (A).

It is preferred that in the fluorocarbon containing SiH groups, one unit of the General Formula 1 or $R^{10}$ in the General Formula 1 is a dialkylhydrogensiloxane group, the terminal group is an SiH group such as a dialkylhydrogensiloxane group, a silyl group, or the like. An example of the fluorocarbon includes those expressed by the following General Formula 3.

Examples of the catalyst, which is Component (D), include those any known as an addition reaction catalyst in the art. Specific examples of the catalyst include chloroplatinic acid, alcohol-modified chloroplatinic acid, complexes of chloroplatinic acid and olefins, platinum black or palladium supported on a carrier such as alumina, silica, carbon, or the like, and Group VIII elements of the Periodic Table or compounds thereof such as complexes of rhodium and olefins, chlorotris(triphenylphosphine) rhodium (an Wilkinson catalyst), rhodium (III) acetyl acetonate, or the like. It is preferred to dissolve these complexes in an alcohol solvent, an ether solvent, a hydrocarbon solvent, or the like.

The fluorocarbon siloxane rubber composition is not particularly limited, and it may suitably be selected according to the purpose and may include various additives. For example, dispersing agents such as diphenylsilane diol, low polymer chain end hydroxyl group-blocked dimethylpolysiloxane, hexamethyl disilazane, heat resistance improvers such as ferrous oxide, ferric oxide, cerium oxide, octyl acid iron, or the like; and colorants such as pigments or the like, may be added as a compounding agent, if necessary.

The belt member is obtained by coating the surface of a heat resistant resin or metal belt with the fluorocarbon siloxane rubber composition, and heat and cure it. The composition may be diluted to form a coating solution with a solvent such as m-xylene hexafluoride, benzotrifluoride, or the like. The heat curing temperature and time can be suitably selected. The heat curing temperature and time can be suitably selected within the ranges of 100° C. to 500° C. and 5 seconds to 5 hours, according to a type of the belt, a process for manufacturing the belt, or the like.

The thickness of the fluorocarbonsiloxane rubber layer on the surface of the belt member is not specifically limited, can be appropriately selected according to the purpose and is preferably from 20 μm to 500 μm, and more preferably from 40 μm to 200 μm.

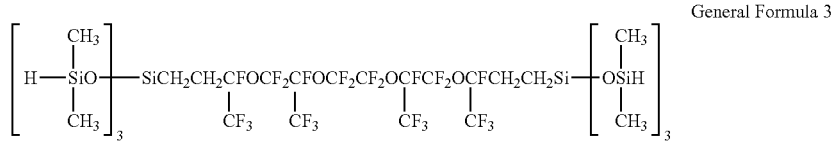

General Formula 3

The filler, which is Component (C), may be various fillers used in ordinary silicone rubber compositions. Examples of the filler include reinforcing fillers such as mist silica, precipitated silica, carbon powder, titanium dioxide, aluminum oxide, quartz powder, talc, sericite, bentonite, or the like; fiber fillers such as asbestos, glass fiber, organic fibers or the like.

The surface roughness of the belt member in terms of arithmetic average roughness Ra is preferably 20 μm or less, more preferably 5 μm or less, and further preferably 1 μm or less, for efficient production of a electrophotographic image-receiving sheet having a smooth and glossy surface. Arithmetic average roughness may be measured by JIS B 0601, B 0651, and B 0652.

<Image Forming Apparatus>

Figure 2:
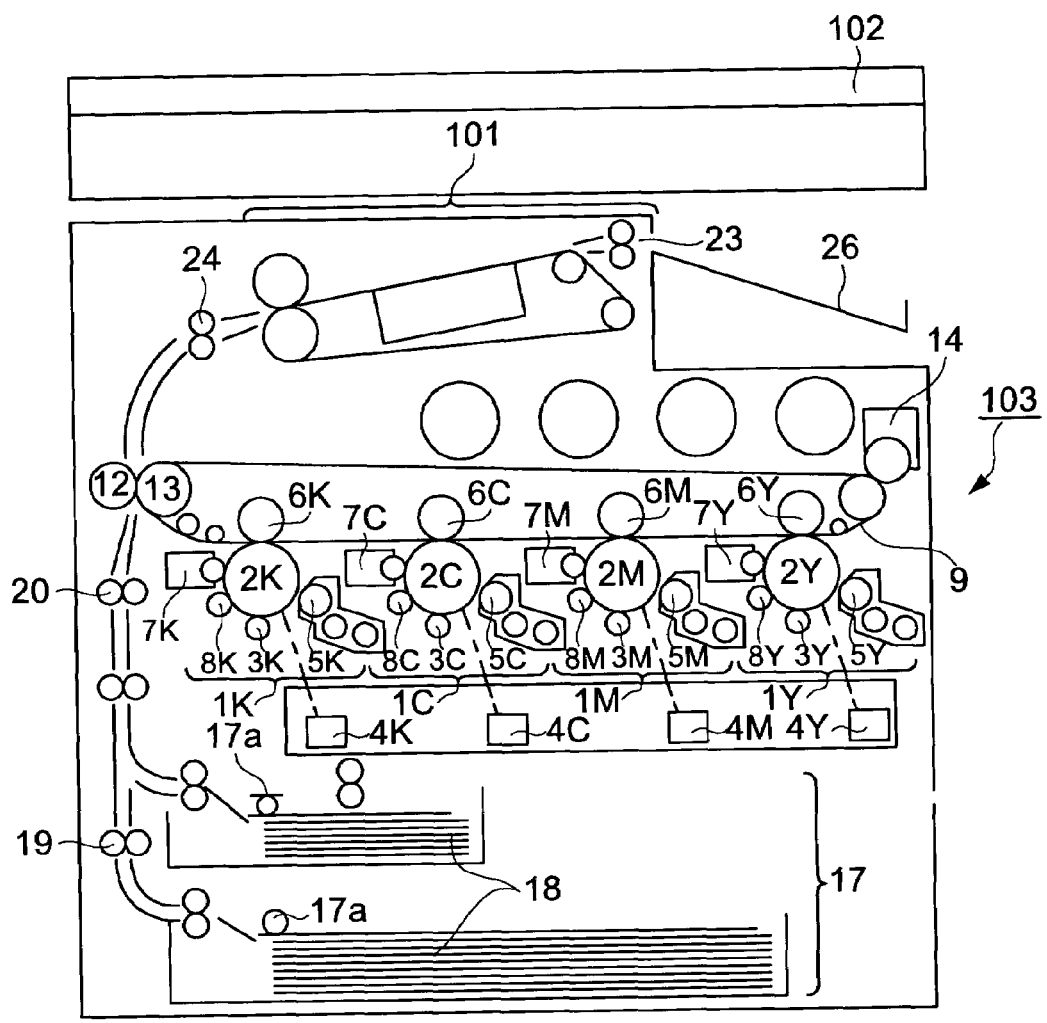
FIG. 2 is a schematic view of an example of an electrophotographic apparatus for use in the present invention.

FIG. 2 is a schematic diagram of a color copying machine (image forming apparatus) constituting the electrophotographic printing system of the present embodiment. The copying machine 100 comprises a main body 103 and an image reader (document read means) 102. The main body 103 houses an image output section (image-forming section) and a image-fixing device 101.

The image forming section comprises an endless intermediate image transfer belt 9 which is spanned over plural tension rollers and is rotated, electrophotographic image forming units 1Y, 1M, 1C, and 1K, a belt cleaner 14 facing the intermediate image transfer belt 9, a secondary image transfer roller 12 facing the intermediate image transfer belt 9, sheet tray 17 for housing sheets of plain paper (image-receiving sheet) 18(S) and sheets of dedicated glossy paper (image-receiving sheet) 18(P), respectively, a pickup roller 17a, a pair of conveyer rollers 19 and 24, a pair of resist rollers 20, and a second paper output tray 26. The electrophotographic image forming units 1Y, 1M, 1C, and 1K are arranged from upstream to downstream of a rotation direction of the intermediate image transfer belt 9 and serve to form yellow, magenta, cyan, and black color toner images, respectively.

Each of the electrophotographic image forming units 1Y, 1M, 1C, and 1K comprises, for example, a photoconductive drum 2, an electrostatic charger roller 3, a development device 5, a primary image transfer roller 6, a drum cleaner 7, and a charge eliminating roller 8.

Figure 3:
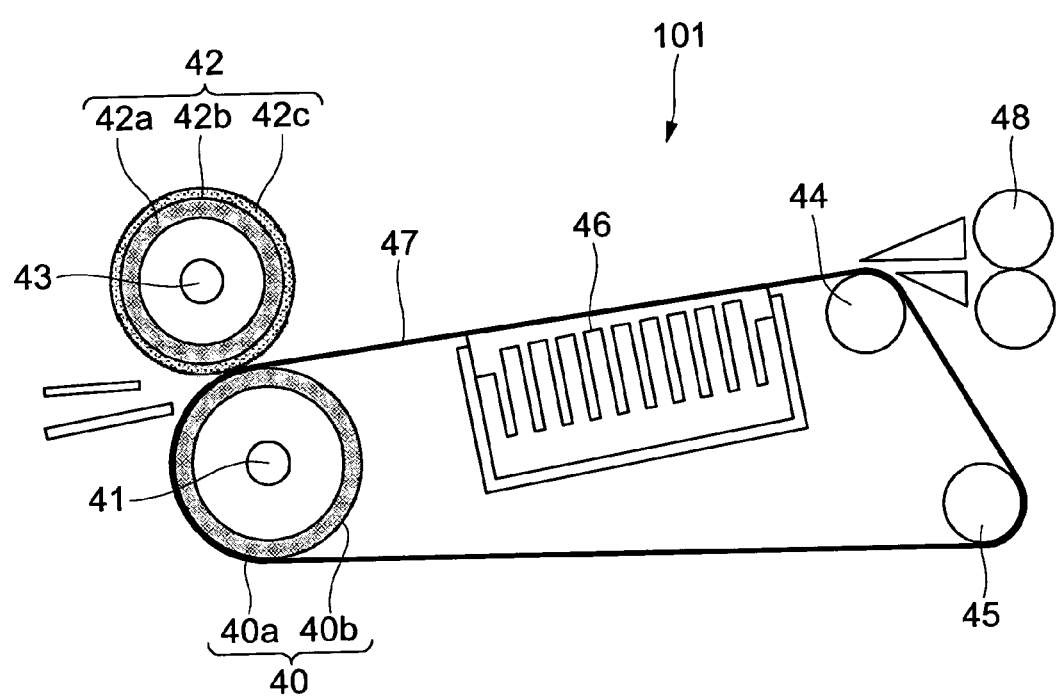
FIG. 3 is a schematic sectional view of an example of an image-fixing device for use in the present invention.
Figure 4:
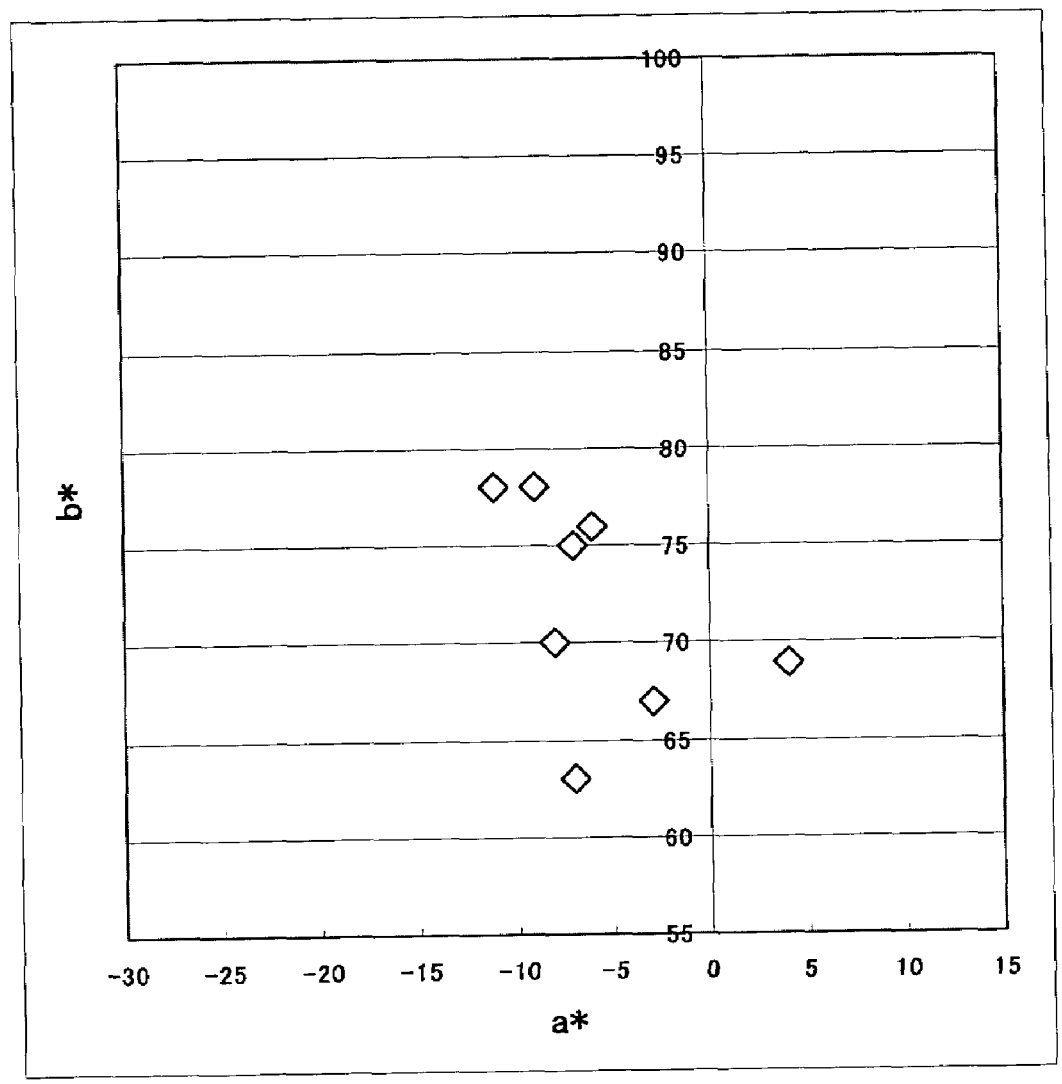
FIG. 4 is a graph showing hues of reproduced yellow (Y) colors in examples and comparative examples below.
Figure 5:
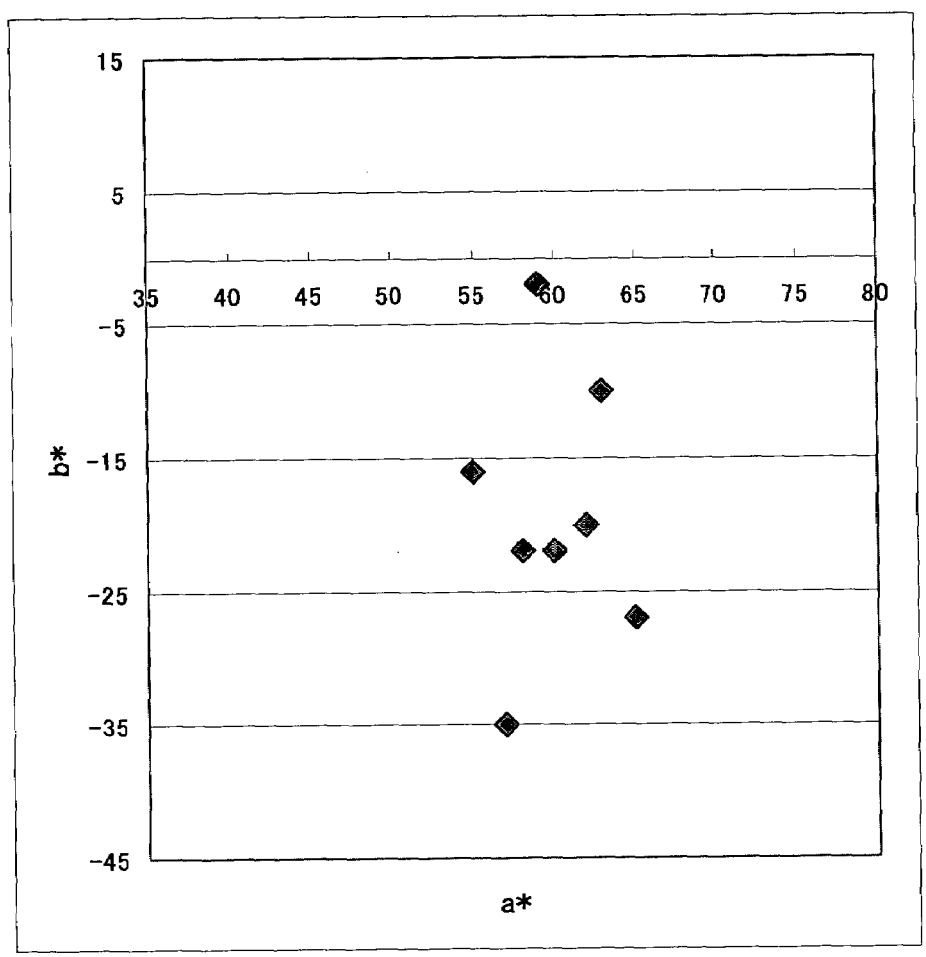
FIG. 5 is a graph showing hues of reproduced magenta (M) colors in the examples and comparative examples.
Figure 6:
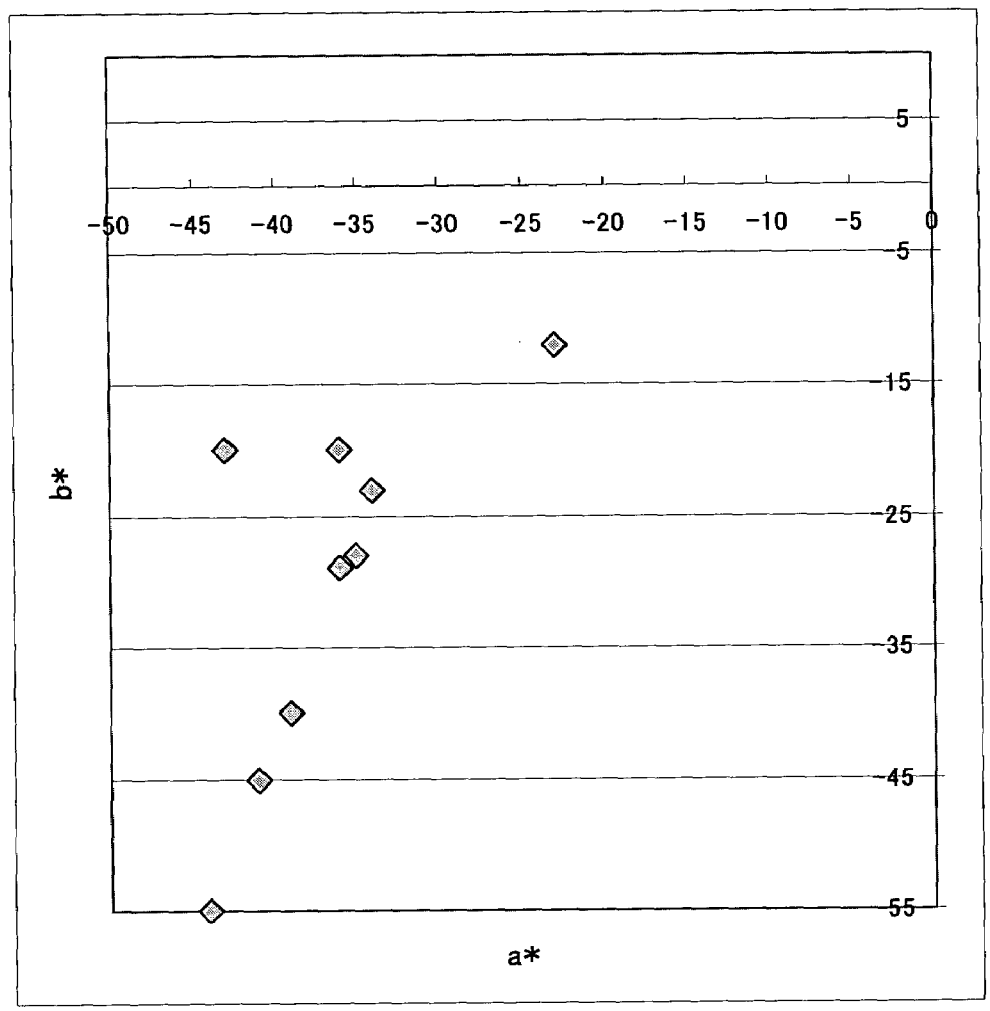
FIG. 6 is a graph showing hues of reproduced cyan (C) colors in the examples and comparative examples.
Figure 7:
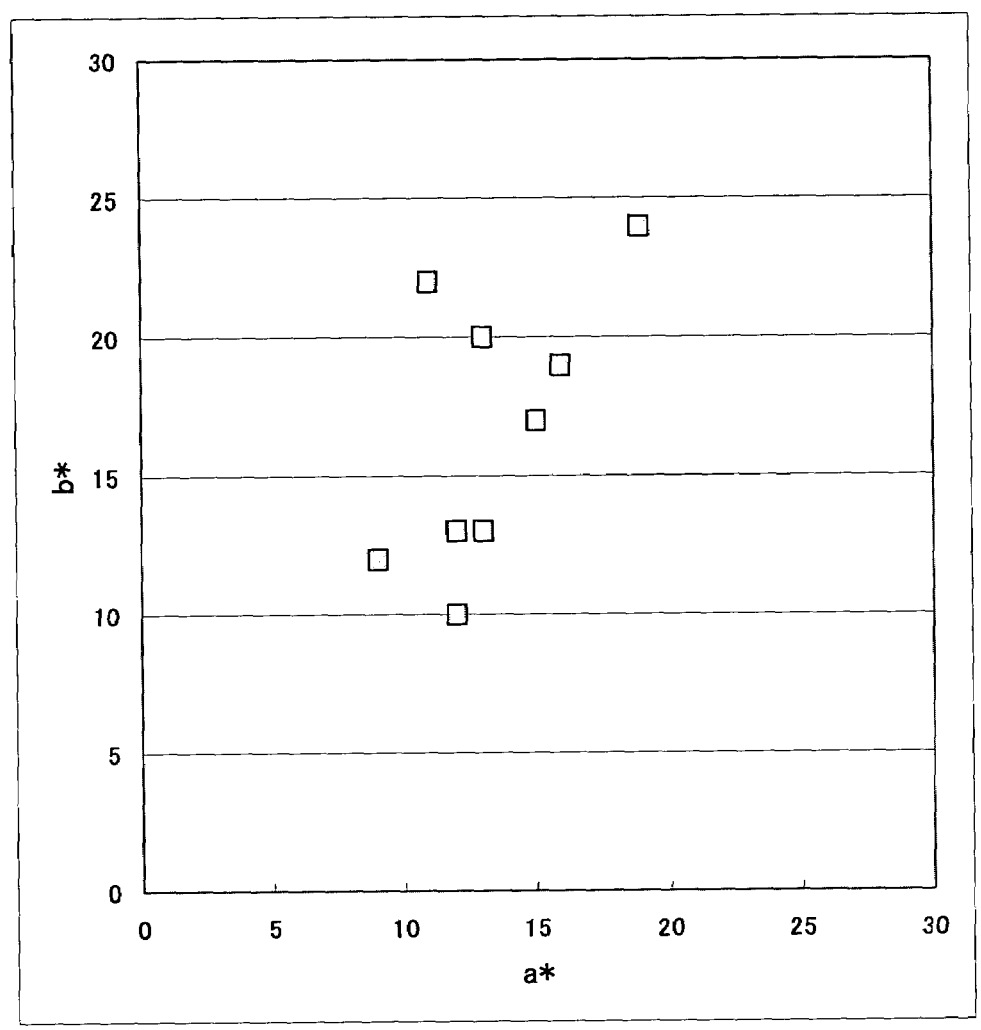
FIG. 7 is a graph showing hues of reproduced Skin Tone 1 in the examples and comparative examples.
Figure 8:
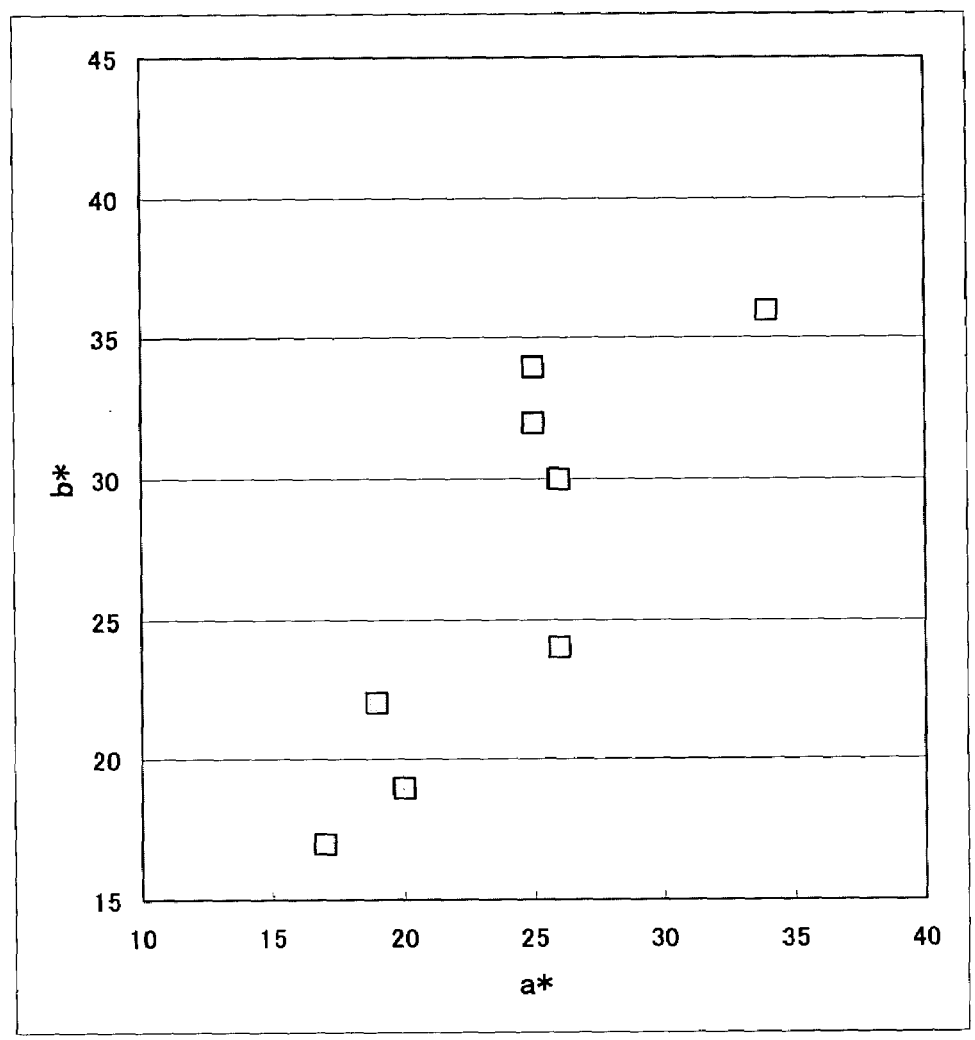
FIG. 8 is a graph showing hues of reproduced Skin Tone 2 in the examples and comparative examples.
Figure 9:
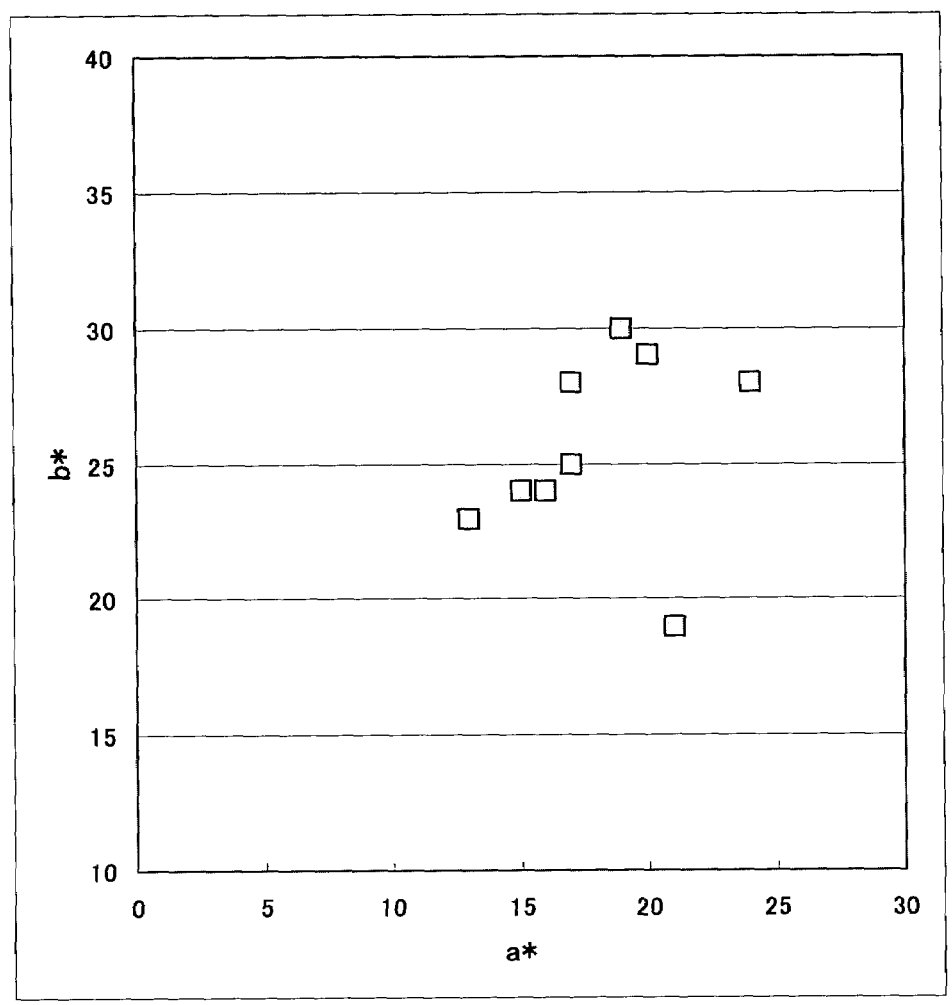
FIG. 9 is a graph showing hues of reproduced Skin Tone 3 in the examples and comparative examples.
Figure 10:
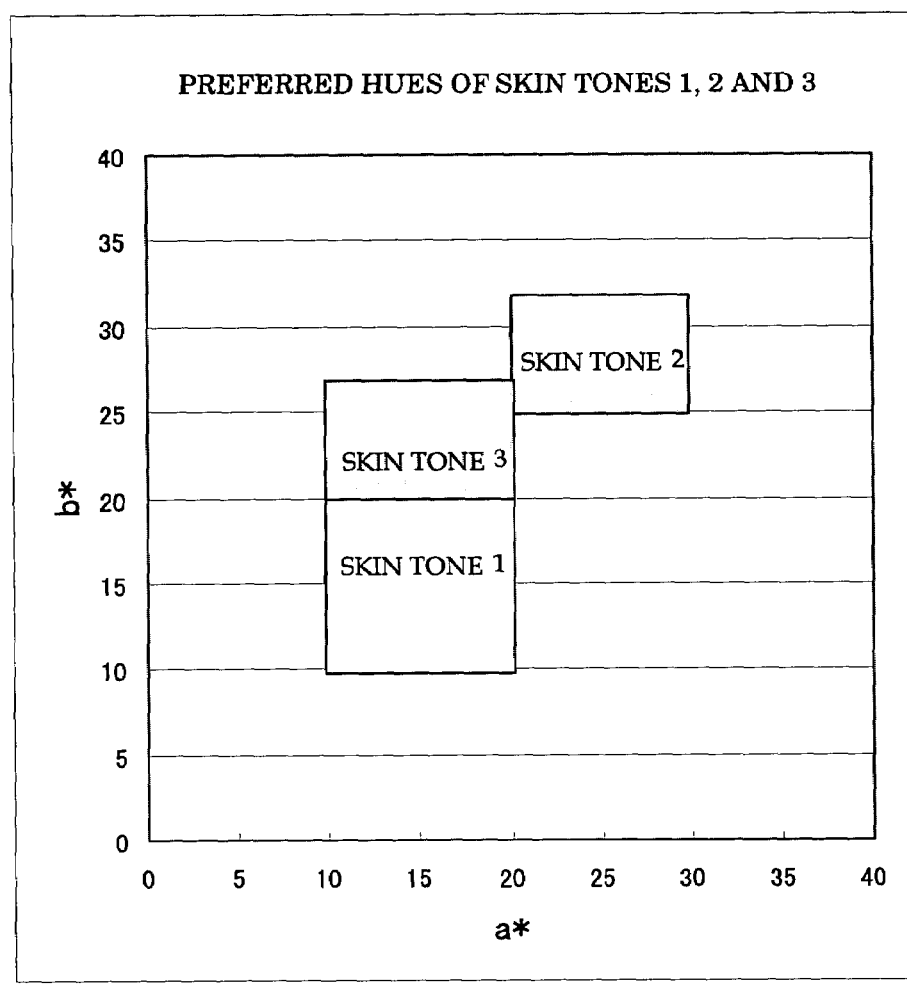
FIG. 10 is a graph showing preferred hues of Skin Tones 1, 2 and 3.

FIG. 3 illustrates a configuration of the image-fixing device 101. The image-fixing device 101 is a belt fixing device which comprises a heating and fixing roller (heating roller) 40 having a heat source, a releasing roller (tension roller) 44, a steering roller (tension roller) 45, a fixing belt (endless belt) 47, a pressure roller 42, and a cooling device (cooling unit) 46. The fixing belt 47 is spanned among the heating and fixing roller 40, the releasing roller 44, and the steering roller 45. The pressure roller 42 serves to press the heating and fixing roller 40 via the fixing belt 47 to thereby form a nip. The cooling device (cooling unit) 46 is arranged downstream the nip of the rotation direction of the fixing belt 47 and serves to cool the fixing belt 47. An image-receiving sheet 18 bearing a toner is conveyed to the nip so as to bring the toner image into contact with the fixing belt 47, and the toner image is heated and fixed therein. The cooling device 46 then cools the fixing belt 47 and the image-receiving sheet 18, and the image-receiving sheet 18 is released (peeled off) from the fixing belt 47.

The heating and fixing roller 40 comprises a core 40a and a releasing layer 40b arranged on the surface of the core 40a. The core 40a is made of a metal having high thermal conductivity. The releasing layer 40b is made of a fluorocarbon resin layer such as a PFA tube. A heat source 41 such as a halogen lamp is arranged inside the core 40a and serves to heat the heating and fixing roller 40 to a predetermined surface temperature to thereby heat the fixing belt 47 and the image-receiving sheet 18 bearing the toner image. The pressure roller 42 comprises a core 42a, an elastic layer 42b arranged around the core 42a, and a releasing layer 42c arranged on the surface of the elastic layer 42b. The core 42a is made of a metal having high thermal conductivity. The elastic layer 42b is made of, for example, a silicone rubber having a rubber hardness (JIS-A) of about 40 degrees. The releasing layer 42c is a fluorocarbon resin layer such as a PFA tube. A heat source 43 such as a halogen lamp is arranged inside the core 42a and serves to heat the pressure roller 42 to a predetermined surface temperature. The pressure roller 42 thus serves to apply pressure to the image-receiving sheet 18 during image-fixing procedure and to heat the image-receiving sheet from its back side. The configurations of the heating and fixing roller 40 and the pressure roller 42 are not limited to those mentioned above, as long as a toner image formed on the image-receiving sheet 18 can be fixed to the image-receiving sheet 18 by the aid of the fixing belt 47.

The releasing roller 44 serves to remove the image-receiving sheet 18 from the fixing belt 47 by action of the rigidity of the image-receiving sheet 18 itself. The outer shape (outer dimensions) of the releasing roller 44 is determined depending on the adhesion between the fixing belt 47 and the image-receiving sheet 18, and the winding angle of the fixing belt 47 to the releasing roller 44. The steering roller 45 serves to correct and regulate any wandering of the fixing belt 47 caused by rotation of the fixing belt 47 and to avoid damage of the edge of the belt due to wandering. This steering roller 45 is supported at one axial end thereof and can be tilted to a desired angle with respect to the heating and fixing roller 40. Thus, is the fixing belt 47 wanders, the steering roller serves to change the direction of the belt travel to an opposite direction.

The cooling device 46 serves to cool the fixing belt 47 and the image-receiving sheet 18 in intimate contact with the fixing belt 47 and is arranged on an inner radius of the fixing belt 47 downstream from the heating and fixing roller 40 and upstream from the releasing roller 44. The cooling device 46 is capable of cooling a transparent resin layer 18a and the toner image on the surface of the image-receiving sheet 18 fused by action of the heating and fixing roller 40 and the pressure roller 42 and of solidifying the entire surface of the image smoothly along the surface of the fixing belt 47.

The fixing belt 47 can be prepared, for example, in the following manner. A silicone rubber primer DY39-115 (trade name, available from Dow Corning Toray Silicone Co., Ltd., Japan) is applied to an endless film made of a thermosetting polyimide and is air-dried for 30 minutes. The resulting article is dipped in a coating liquid comprising 100 parts by mass of a silicone rubber precursor DY35-796AB (trade name, available from Dow Corning Toray Silicone Co., Ltd., Japan) and 30 parts by mass of n-hexane to thereby form a coated film, is subjected to primary curing at 120° C. for 10 minutes and thereby yields a silicone rubber layer 40 µm thick thereon.

The silicone rubber layer is then dipped in a coating liquid comprising 100 parts by mass of a fluorocarbon siloxane rubber precursor SIFEL 610 (trade name, available from Shin-Etsu Chemical Co., Ltd., Japan) and 20 parts by mass of a fluorine-containing solvent (a mixture of m-xylene hexafluoride, perfluoroalkanes, and perfluoro(2-butyltetrahydrofuran)) to form a coated film, is subjected to primary curing at 120° C. for 10 minutes and to secondary curing at 180° C. for 4 hours to yield a fluorocarbon siloxane rubber layer 20 µm thick thereon and thereby yields the fixing belt.

The image-fixing device 101 is arranged below the image reader 102 and above the image forming section (e.g., at image transfer position). The image-fixing device 101 is positioned directly above the image forming section (e.g., the intermediate image transfer belt 9) and directly under the image reader 102. The entire conveying path for the image-receiving sheet 18 extending from the second image transfer position to the image-fixing device 101 is positioned directly above the image forming section (e.g., the intermediate image transfer belt 9). A primary image-fixing line connecting between the secondary image transfer position and the primary image transfer position has a substantially normal vertical component. An image-fixing line connecting between the secondary image transfer position and the image-fixing position has a vertical component less than a horizontal component thereof. The image-receiving sheet 18 is ejected from the image-fixing device 101 to an area directly above the image forming section (e.g., the intermediate image transfer belt 9).

The configuration as above can yield the following advantages. Firstly, the entire apparatus 100 occupies as little space (in particular, as little footprint) as possible even though it comprises the image-fixing device 101. Secondly, the image-receiving sheet 18 is ejected at a relatively high position, and the apparatus can be operated easily.

<Sublimation Dye Transfer Printing System>

In the sublimation dye transfer printing system, for example, a transfer sheet having an ink layer at least comprising a thermally diffusible coloring agent (sublimation coloring agent) arranged on a support is used, and the transfer sheet is heated by a thermal head to thereby transfer the thermally diffusible coloring agent to a thermal transfer recording image-receiving sheet to form a print.

Examples of such sublimation dye transfer printing systems are sublimation dye transfer printers commercially available under the trade names of SV-AP 10 from Matsushita Electronic Industrial Co., Ltd., Japan, LIP-DR 100 from Sony Corporation, Japan, CHC-S545-6 and CHC-S1045-SE from Shinko Electric Co., Ltd., Japan.

<Marking Printing System>

Examples of the marking printing system include an inkjet printing system, a toner jet printing system, in addition to the aforementioned examples.

The present invention will now be described in further detail with reference to the following Examples. The present invention is not limited thereto, however.

—Preparation of Raw Paper—

Broad-leaved (hardwood) bleached kraft pulp (LBKP) was beaten to a Canadian standard freeness (CSF) of 300 ml using a disk refiner and thereby yielded a pulp stock having a fiber length of 0.58 mm. The following additives were added to the pulp stock, each in a proportion based on the mass of the pulp: cationic starch, 1.2% by mass; Alkyl ketene dimer (AK D), 0.5% by mass; Anionic polyacrylamide, 0.3% by mass; Epoxidized fatty acid amide (EFA), 0.2% by mass; and Polyamide-polyamine-epichlorohydrin, 0.3% by mass. In the alkyl ketene dimer (AKD), the alkyl moiety is derived from fatty acids mainly containing behenic acid. In the epoxidized fatty acid amide (EFA), the fatty acid moiety is derived from fatty acids mainly containing behenic acid.

A raw paper of weighting of 150 g/m$^2$ was manufactured from the pulp paper material obtained using a Fortlinear paper machine. 1.0 g/m$^2$ PVA and 0.8 g/m$^2$ CaCl$_2$ were made to adhere thereto by a size press device in the middle of the drying zone of the Fortlinear paper machine.

In the last step of the paper-making process, the density was adjusted to 1.01 g/cm$^3$ using a soft calender. The paper was passed through so that the side (surface) of the raw paper whereon the toner-image-receiving layer is provided, came into contact with the metal roller. The surface temperature of the metal roller was 140° C. The Oken type smoothness of the obtained raw paper was 265 seconds, and the Stökigt sizing degree was 127 seconds.

—Preparation of Support—

The above-prepared raw paper was subjected to corona discharge at a power of 17 kW. A single layer of a polyethylene resin having a composition shown in Table 1 was extruded and laminated onto the back side of the raw paper at a temperature of discharged fused film of 320° C. and at a line speed of 250 m/minute using a cooling roll with a surface matte roughness of 10 mm and thereby yielded a back side polyethylene resin layer 22 μm thick.

TABLE 1

| Composition | MFR (g/10-min) | Density (g/cm$^3$) | Content (mass %) |
|---|---|---|---|
| HDPE | 12 | 0.967 | 70 |
| LDPE | 3.5 | 0.923 | 30 |

Next, a single layer of a mixture of master batches was extruded and laminated onto the front side of the raw paper, on which the toner-image-receiving layer would be formed, at a line speed of 250 m/minute using a cooling roll with a surface matte roughness of 0.7 μm and thereby yielded a front side polyethylene resin layer 29 μm thick. The mixture of master batches had a final composition shown in Table 3, contained first master batch pellets containing the LDPE as in Table 1 and titanium dioxide (TiO$_2$) in a composition shown in Table 2, and second master batch pellets containing 5% by mass of ultramarine blue. The front side polyethylene resin layer and the backside polyethylene resin layer were subjected to corona discharge at a power of 18 kW and 12 kW, respectively. A gelatin undercoat layer was formed on the front side polyethylene resin layer, an antistatic undercoat layer containing colloidal alumina, colloidal silica, and a poly(vinyl alcohol) (PVA) was formed on the backside polyethylene resin layer and thereby yielded a support.

TABLE 2

| Composition | Content (mass %) |
|---|---|
| LDPE (ρ = 0.921 g/cm$^3$) | 37.98 |
| Anatase-type titanium dioxide | 60 |
| Zinc stearate | 2 |
| Antioxidant | 0.02 |

TABLE 3

| Composition | Content (mass %) |
|---|---|
| LDPE (ρ = 0.921 g/cm$^3$) | 67.7 |
| Anatase-type titanium dioxide | 30 |
| Zinc stearate | 2 |
| Ultramarine blue | 0.3 |

—Preparation of Electrophotographic Image-receiving Sheet—

To the front side of the above-prepared support, a coating composition for a toner-image-receiving layer was applied to coated amounts shown in Table 4 using a bar coater and thereby yielded an electrophotographic image-receiving sheet. The coating composition contained an aqueous dispersion of a self-dispersible polyester resin, an aqueous dispersion of a carnauba wax, a poly(vinyl alcohol) (PVA) dispersion of titanium dioxide, a polyethylene oxide having a molecular weight of about 100000, and an anionic surfactant.

TABLE 4

| Composition for a toner-image-receiving layer | Coated amount (g/m²) |
|---|---|
| Polyester resin | 11.0 |
| Carnauba wax | 1.2 |
| Anatase-type titanium dioxide | 1.1 |
| PVA-205 | 0.15 |
| Polyethylene oxide | 2.9 |
| Anionic surfactant | 0.3 |

EXAMPLE 1

A test model was prepared by modifying DocuCentre Color 400 (trade name, available from Fuji Xerox Co., Ltd., Japan) and was used as an electrophotographic printing system. Each of the yellow (Y) color, magenta (M) color, cyan (C) color, Skin Tone 1, Skin Tone 2, and Skin Tone 3 below was printed out on the above-prepared electrophotographic image-receiving sheet using an originally prepared color conversion three-dimensional look-up table (LUT) and the electrophotographic printing system. The test model has a configuration shown in FIG. 2, in which the image-fixing section is modified into the belt fixing device of cooling and releasing system shown in FIG. 3.

Skin Tone 1: R=255, G=206, B=179
Skin Tone 2: R=239, G=167, B=127
Skin Tone 3: R=144, G=99, B=59

The RGB values (RGB densities) were measured with a Gretag color densitometer, commercially available from Gretag-Macbeth GmbH in Regensdorf, Switzerland, or an X-Rite color densitometer, commercially available from X-Rite, of Grandville, Mich., at a regular Status A density.

Toners prepared by the aggregation method used in a DocuCentre Color 400 (trade name, available from Fuji Xerox Co., Ltd., Japan) were used herein. The average particle diameters and shape factors of these toners are as follows.

| | Average particle diameter | Shape factor |
|---|---|---|
| K (black) toner | 5.5 μm | 1.35 |
| Y (yellow) toner | 5.9 μm | 1.39 |
| M (magenta) toner | 5.3 μm | 1.33 |
| C (cyan) toner | 5.7 μm | 1.37 |

The temperatures of the heating roller 40 and the pressure roller 42 in the image-fixing device 101 as shown in FIG. 3 were set at 135° C. Separately, the temperature of a thermoplastic resin layer of the electrophotographic image-receiving sheet was measured and was found to be up to 98° C. when the temperatures just mentioned above were set at 135° C. The temperature of an electrophotographic print when it was removed from the fixing belt 47 was 65° C.

The L*a*b* values, glossiness, and sensory image quality of the resulting electrophotographic print according to Example 1 were determined by the following methods. The results are shown in Tables 5 and 6, and FIGS. 4 to 10.

<Determination of L*a*b* Values>

The L*a*b* values were determined using a Gretag colorimeter (Gretag-Macbeth GmbH in Regensdorf, Switzerland) at a light source D50 and a view angle of 2 degrees without filter.

<Glossiness>

The glossiness was determined according to JIS Z 8741 using a glossimeter at an incident angle of 45 degrees and a reflection angle of 45 degrees. <Sensory Image Quality Evaluation>

An image of a portrait taken with a digital still camera (DSC) was printed out using the printing system, and the resulting image was visually observed and rated on a scale of 10 by twenty persons who can evaluate regular photographic image quality. An average of ratings of the twenty persons was employed as the rating, by rounding off the number to the nearest integer. The overall rating was determined by visual sensory evaluation according to an evaluation method generally employed in silver halide photographs.

EXAMPLE 2

A printed image of Example 2 was produced and its image quality was evaluated by the procedure of Example 1, except that the color conversion three-dimensional look-up table (LUT) was changed to reproduce the specific skin tones more desirably. The results are shown in Tables 5 and 6, and FIGS. 4 to 10.

EXAMPLE 3

A printed image of Example 3 was produced by the procedure of Example 2, except that the color conversion three-dimensional look-up table (LUT) was further changed to thereby reproduce cyan (C) color more satisfactorily, and its image quality was evaluated by the procedure of Example 1. The results are shown in Tables 5 and 6, and FIGS. 4 to 10.

COMPARATIVE EXAMPLE 1

An image was printed on a standard color photographic paper using a digital silver halide photographic printing system Frontier 330, both available from Fuji Photo Film Co., Ltd., Japan. The image quality of the printed image was evaluated by the procedure of Example 1. The results are shown in Tables 5 and 6, and FIGS. 4 to 10.

COMPARATIVE EXAMPLE 2

An image was printed on an electrophotographic image-receiving sheet Digital Coat Glossy Paper available from Fuji Xerox Co., Ltd., Japan using an original DocuCentre Color 400 (Fuji Xerox Co., Ltd., Japan) having the configuration shown in FIG. 2 without modification. The image quality of the printed image was evaluated by the procedure of Example 1. The results are shown in Tables 5 and 6, and FIGS. 4 to 10.

COMPARATIVE EXAMPLE 3

An image was printed on an electrophotographic image-receiving sheet Xerographic Photo Paper available from Fuji Photo Film Co., Ltd., Japan using an electrophotographic printing system DocuColor 1250PF available from Fuji Xerox Co., Ltd., Japan. The image quality of the printed image was evaluated by the procedure of Example 1. The results are shown in Tables 5 and 6, and FIGS. 4 to 10.

COMPARATIVE EXAMPLE 4

An image was printed on an electrophotographic image-receiving sheet Digital Coat Glossy Paper using an electrophotographic printing system DocuColor 1250CP, both available from Fuji Xerox Co., Ltd., Japan. The image quality of the printed image was evaluated by the procedure of Example 1. The results are shown in Tables 5 and 6, and FIGS. 4 to 10.

COMPARATIVE EXAMPLE 8

An image was printed on an inkjet image-receiving sheet hp Premium Plus Photo Paper, Glossy, using an Inkjet Printer DeskJet 5551, both available from Hewlett-Packard Company, Palo Alto, Calif., with a standard ink under standard recommended conditions. The image quality of the printed image was evaluated by the procedure of Example 1. The results are shown in Tables 5 and 6, and FIGS. 4 to 10.

TABLE 5

|  | Y color | | M color | | C color | | Skin Tone 1 | | | Skin Tone 2 | | | Skin Tone 3 | | |
| --- | --- | --- | --- | --- | --- | --- | --- | --- | --- | --- | --- | --- | --- | --- | --- |
|  | a* | b* | a* | b* | a* | b* | L* | a* | b* | L* | a* | b* | L* | a* | b* |
| Com. Ex. 1 | 4 | 69 | 57 | −35 | −35 | −28 | 79 | 15 | 17 | 68 | 26 | 30 | 43 | 16 | 24 |
| Com. Ex. 2 | −11 | 78 | 55 | −16 | −23 | −12 | 82 | 11 | 22 | 72 | 25 | 34 | 45 | 19 | 30 |
| Ex. 1 | −11 | 78 | 55 | −16 | −23 | −12 | 81 | 13 | 20 | 70 | 25 | 32 | 44 | 17 | 28 |
| Ex. 2 | −11 | 78 | 55 | −16 | −23 | −12 | 80 | 15 | 17 | 69 | 26 | 30 | 42 | 15 | 24 |
| Ex. 3 | −11 | 78 | 55 | −16 | −34 | −23 | 80 | 15 | 17 | 69 | 26 | 30 | 42 | 15 | 24 |
| Com. Ex. 3 | −7 | 75 | 58 | −22 | −36 | −29 | 76 | 19 | 24 | 66 | 34 | 36 | 36 | 24 | 28 |
| Com. Ex. 4 | −6 | 76 | 59 | −2 | −36 | −20 | 78 | 16 | 19 | 69 | 26 | 24 | 41 | 21 | 19 |
| Com. Ex. 5 | −9 | 78 | 65 | −27 | −44 | −55 | 83 | 12 | 13 | 74 | 20 | 19 | 51 | 13 | 23 |
| Com. Ex. 6 | −7 | 63 | 63 | −10 | −41 | −45 | 84 | 12 | 10 | 75 | 17 | 17 | 51 | 15 | 24 |
| Com. Ex. 7 | −8 | 70 | 60 | −22 | −43 | −20 | 87 | 13 | 13 | 77 | 19 | 22 | 52 | 17 | 25 |
| Com. Ex. 8 | −3 | 67 | 62 | −20 | −39 | −40 | 84 | 9 | 12 | 74 | 19 | 22 | 50 | 20 | 29 |

COMPARATIVE EXAMPLE 5

An image was printed on an inkjet image-receiving sheet MC Glossy Paper using an Inkjet Printer PM-4000 PX, both available from Seiko Epson Corporation, Japan, with a standard ink under standard recommended conditions. The image quality of the printed image was evaluated by the procedure of Example 1. The results are shown in Tables 5 and 6, and FIGS. 4 to 10.

COMPARATIVE EXAMPLE 6

An image was printed on an inkjet image-receiving sheet PM Photo Paper (glossy) using an Inkjet Printer PM-950 C, both available from Seiko Epson Corporation, Japan, with a standard ink under standard recommended conditions. The image quality of the printed image was evaluated by the procedure of Example 1. The results are shown in Tables 5 and 6, and FIGS. 4 to 10.

COMPARATIVE EXAMPLE 7

An image was printed on an inkjet image-receiving sheet Super Photo Paper SP-101 using an Inkjet Printer BJF-900, both available from Canon Inc., Japan, with a standard ink under standard recommended conditions. The image quality of the printed image was evaluated by the procedure of Example 1. The results are shown in Tables 5 and 6, and FIGS. 4 to 10.

TABLE 6

|  | 45-Degree glossiness | Sensory evaluation | | |
| --- | --- | --- | --- | --- |
|  |  | Single colors | Skin tones | Overall rating |
| Com. Ex. 1 | 87 | 4 | 8 | 5 |
| Com. Ex. 2 | 89 | 7 | 3 | 4 |
| Ex. 1 | 91 | 7 | 6 | 7 |
| Ex. 2 | 92 | 7 | 8 | 8 |
| Ex. 3 | 91 | 8 | 8 | 8 |
| Com. Ex. 3 | 31 | 6 | 2 | 3 |
| Com. Ex. 4 | 57 | 5 | 4 | 3 |
| Com. Ex. 5 | 18 | 2 | 3 | 3 |
| Com. Ex. 6 | 25 | 2 | 4 | 4 |
| Com. Ex. 7 | 41 | 4 | 4 | 3 |
| Com. Ex. 8 | 75 | 3 | 3 | 3 |

Tables 5 and 6, and FIGS. 4 to 10 show that the silver halide photographic printing system of Comparative Example 1 produces a print with a very good hue in the specific skin tones but undesirable hues in the single colors.

The electrophotographic printing systems of Comparative Examples 2 to 4 each produce a print with a good hue in the single colors but undesirable hues in the specific skin tones and a decreased glossiness.

The inkjet printing systems of Comparative Examples 5 to 8 each produce a print with undesirable hues in the single colors and in the specific skin tones and a decreased glossiness.

In contrast, the electrophotographic printing systems of Examples 1 to 3 each produce a print with significantly improved sensory image quality of 7 or more and with a high glossiness.

Figure 11:
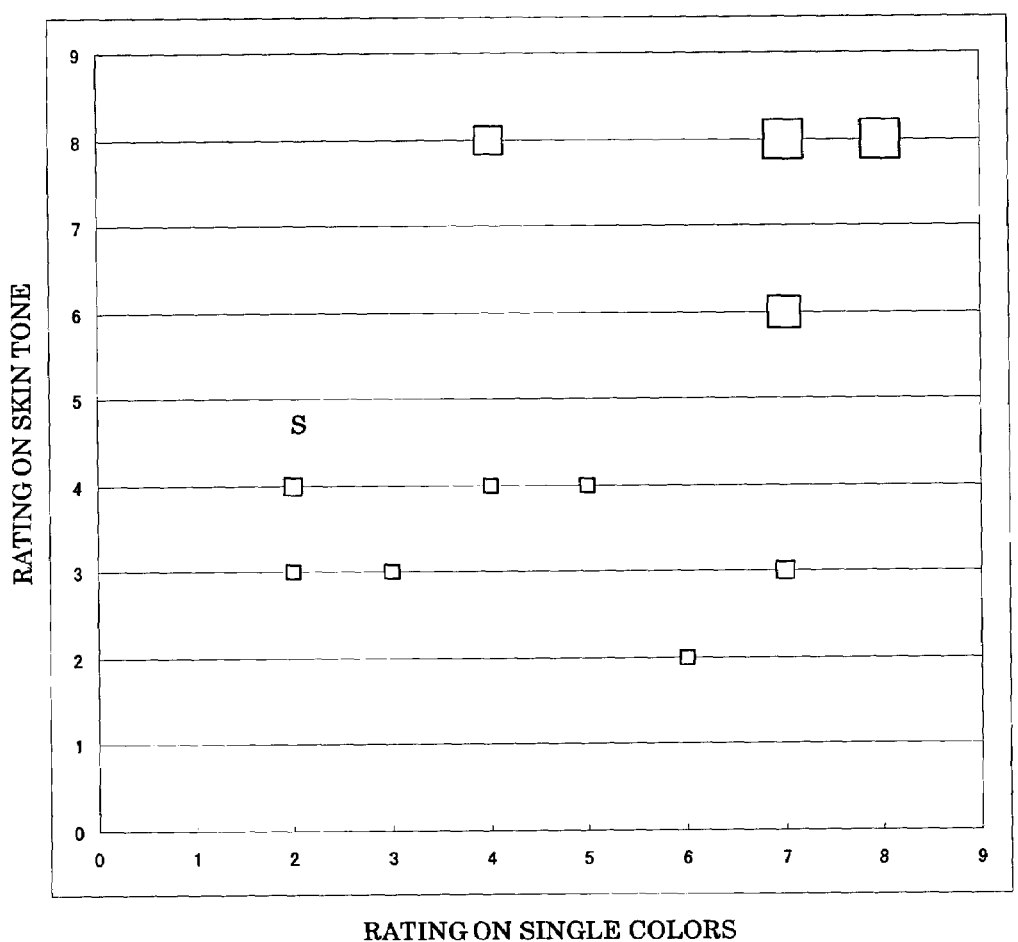
FIG. 11 is a graph showing the relationship between ratings on the single colors and ratings on the specific skin tones.
Figure 12:
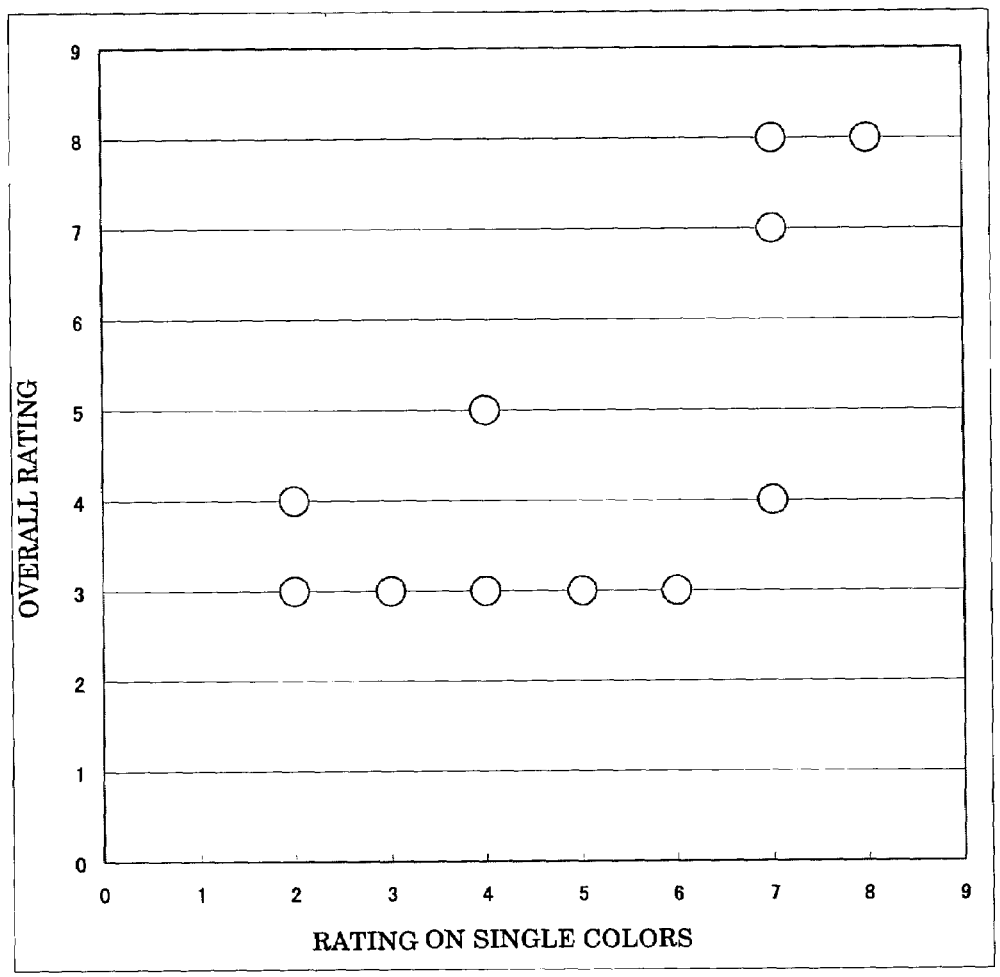
FIG. 12 is a graph showing the relationship between ratings on the single colors and the overall rating.
Figure 13:
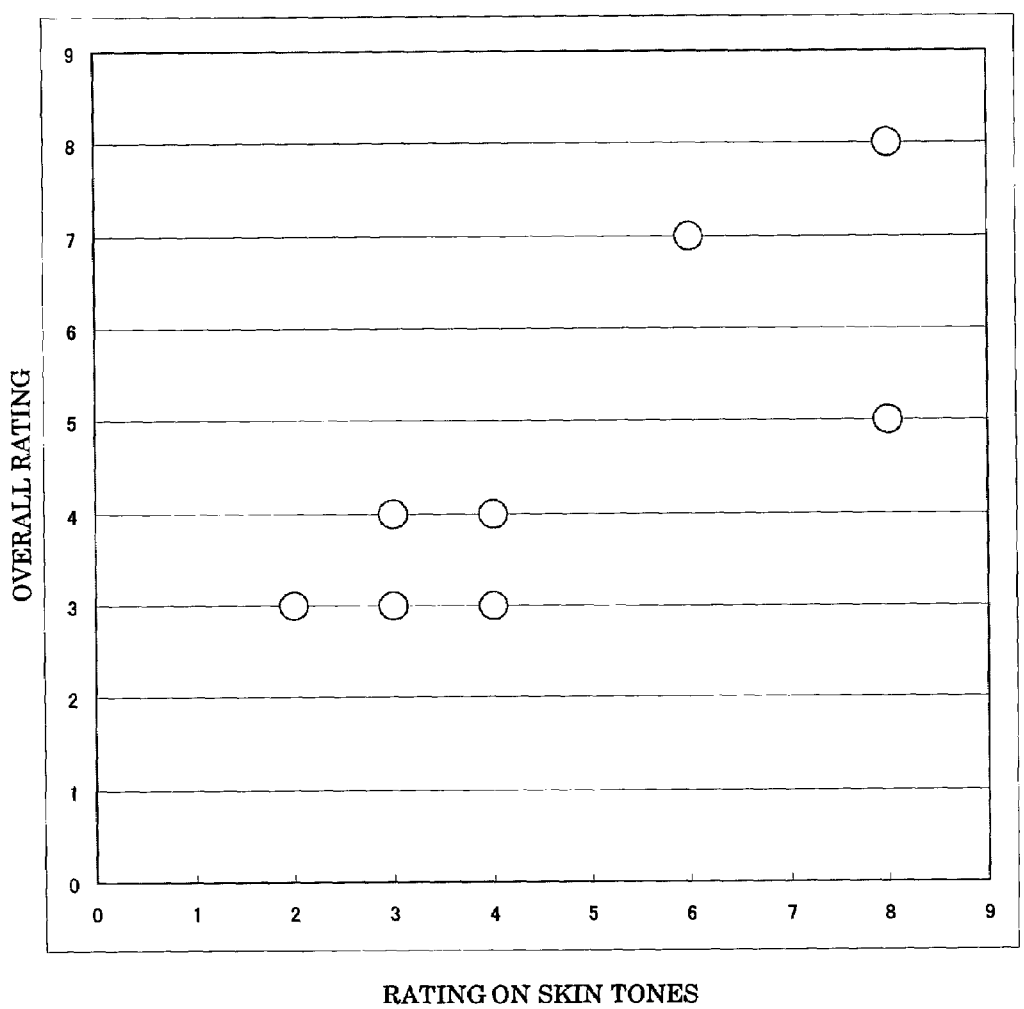
FIG. 13 is a graph showing the relationship between ratings on the specific skin tones and the overall rating.
Figure 14:
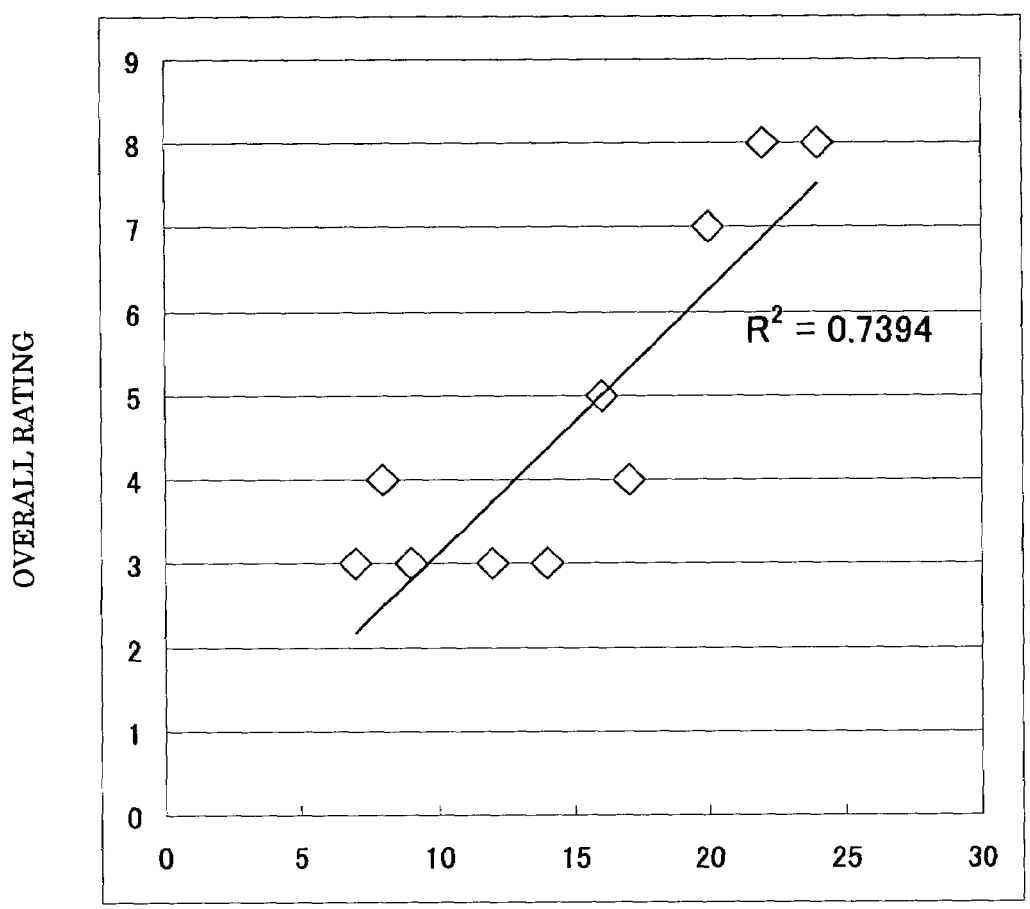
FIG. 14 is a graph showing the relationship between the overall rating and the total of [(rating on the single colors)× 2] and (rating on the specific skin tones).
Figure 15:
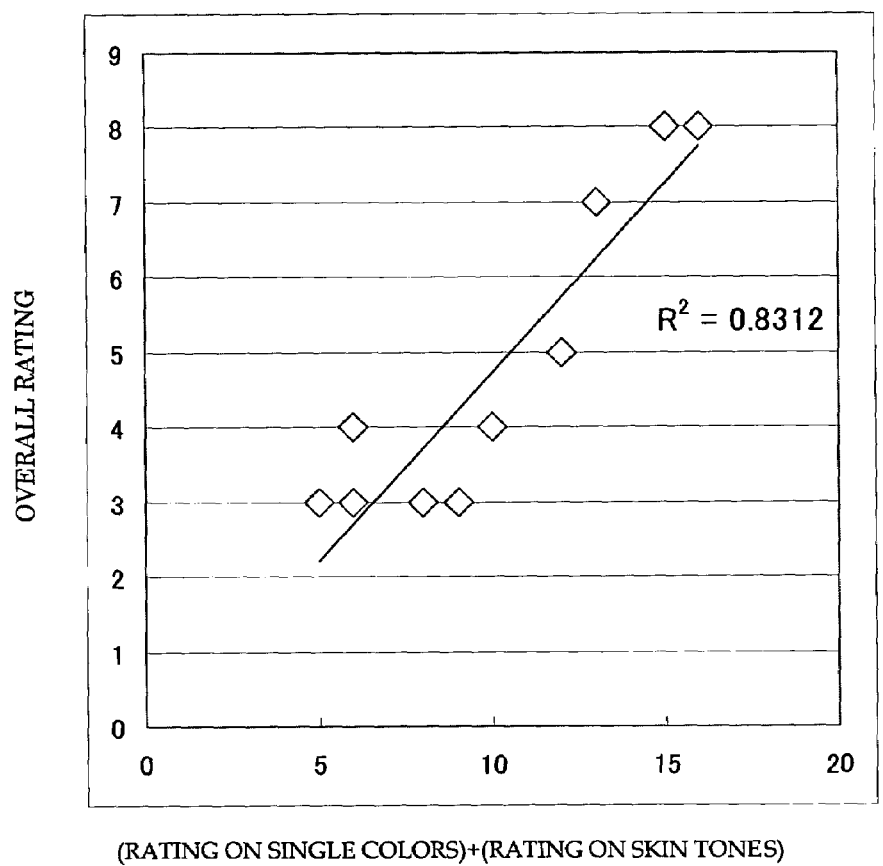
FIG. 15 is a graph showing the relationship between the overall rating and the total of (rating on single colors) and (rating on specific skin tones).
Figure 16:
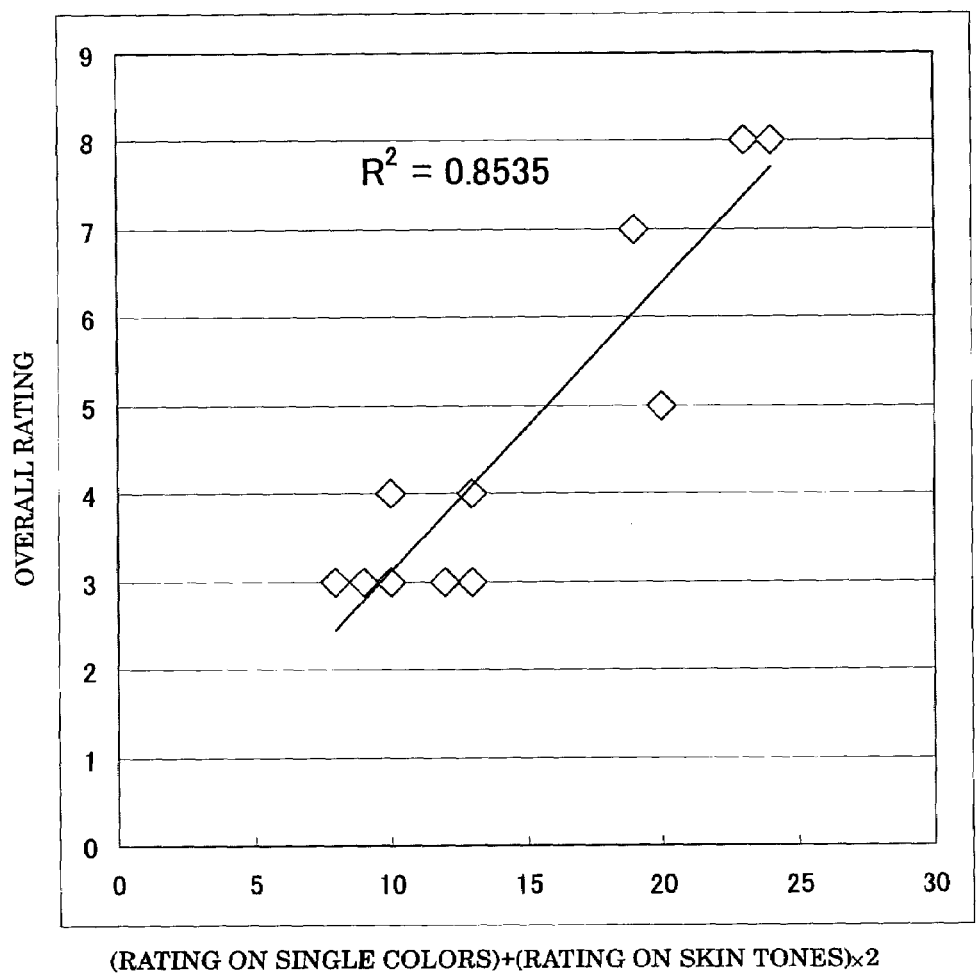
FIG. 16 is a graph showing the relationship between the overall rating and the total of (rating on single colors) and [(rating on specific skin tones)×2].
Figure 17:
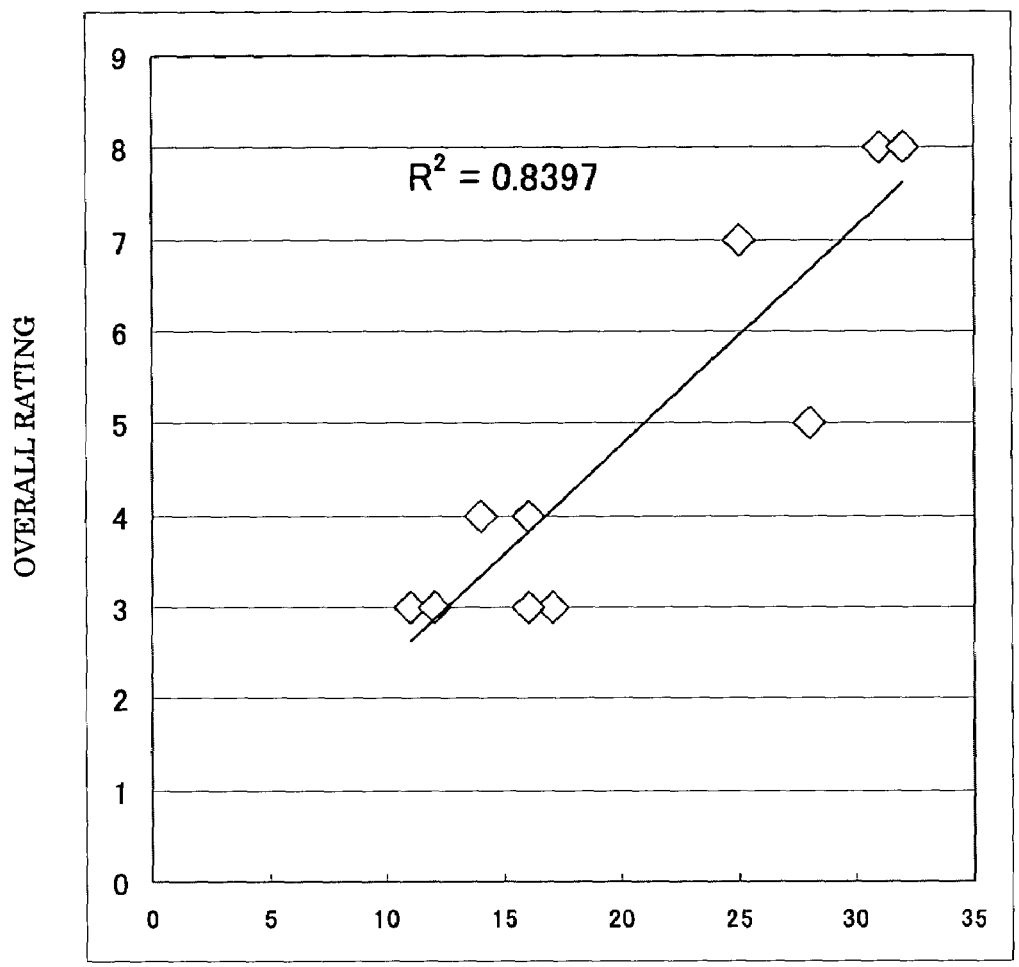
FIG. 17 is a graph showing the relationship between the overall rating and the total of (rating on single colors) and [(rating on specific skin tones)×3].

The relationship among the sensory evaluation on the single colors, that on the specific skin tones, and the overall evaluation (overall rating) are shown in FIGS. 11 to 13. To further clarify the magnitude of influence of the sensory evaluation on the single colors, that on the specific skin tones, and the overall evaluation, the measured data were subjected to data correction to thereby determine correlation among these factors. The results are shown in FIGS. 14 to 17. The result in FIG. 16 exhibits the highest correlation. Therefore, the evaluation on the specific skin tones affects the overall evaluation as much as two times that of the evaluation on the single colors.

The present invention can solve the various problems in the conventional technologies and can provide a digital printing system that can satisfactorily reproduce a yellow (Y) color, a magenta (M) color, and a cyan (C) color and can excellently reproduce specific skin tones, can produce a printed image with significantly improved sensory image quality and is suitable for use especially as an electrophotographic printing system or a sublimation dye transfer printing system.

What is claimed is:

1. A digital printing system, comprising:
   an image processing means for processing digital image data; and
   an image output means for producing a printed output using at least yellow (Y), magenta (M), and cyan (C) coloring materials,
   wherein the system is so configured as to reproduce:
      a yellow (Y) color having a* and b* values of −15 to 0 and +71 to +85, respectively, in the CIE 1976 (L*a*b*) color space at a blue density of 1.0 using the yellow (Y) coloring material alone;
      a magenta (M) color having a* and b* values of +50 to +65 and −30 to 0, respectively, in the CIE 1976 (L*a*b*) color space at a green density of 1.0 using the magenta (M) coloring material alone;
      a cyan (C) color having a* and b* values of −45 to −15 and −40 to −5, respectively, in the CIE 1976 (L*a*b*) color space at a red density of 1.0 using the cyan (C) coloring material alone; and
   wherein the system is so configured as to produce a printed output having L*, a*, and b* values of +58 to +78, +20 to +30, and +25 to +32, respectively, in the CIE 1976 (L*a*b*) color space from digital image data having red (R), green (G), and blue (B) values of 239, 167, and 127, respectively, in the RGB color space.

2. A digital printing system according to claim 1, wherein the system is so configured as to produce a printed output having L*, a*, and b* values of +70 to +90, +10 to +20, and +10 to +20, respectively, in the CIE 1976 (L*a*b*) color space from digital image data showing red (R), green (G), and blue (B) values of 255, 206, and 179, respectively, in the RGB color space.

3. A digital printing system according to claim 1, wherein the system is so configured as to produce a printed output having L*, a*, and b* values of +33 to +53, +10 to +20, and +20 to +27, respectively, in the CIE 1976 (L*a*b*) color space from digital image data showing red (R), green (G), and blue (B) values of 144, 99, and 59, respectively, in the RGB color space.

4. A digital printing system according to claim 1, wherein the system is an electrophotographic printing system using an electrophotographic image-receiving sheet,
   the electrophotographic image-receiving sheet comprising:
      a support, and
      at least one toner image-receiving layer arranged on the support.

5. A digital printing system according to claim 4, wherein the support is one selected from coated paper, cast paper, and the support comprising a base and a polyolefin resin layer arranged at least on one side of the base.

6. A digital printing system according to claim 4, wherein the system uses at least a yellow (Y) toner, a magenta (M) toner, a cyan (C) toner, and a black (K) toner, each of these toners having an average particle diameter of 7 μm or less and an average of shape factors represented by the following equation of 1 to 1.5:

$$\text{Shape factor} = (\Pi \times L^2)/(4 \times S)$$

wherein L is a maximum length of a toner particle; and S is a projection area of the toner particle.

7. A digital printing system according to claim 6, wherein the toners each comprise at least a binder resin and a coloring agent, have a volume-average particle diameter distribution coefficient (GSDv) of 1.3 or less, and a ratio (GSDv/GSDn) of the volume-average particle diameter distribution coefficient (GSDv) to a number-average particle diameter distribution coefficient (GSDn) of 0.95 or more.

8. A digital printing system according to claim 6, wherein the system uses at least a yellow (Y) toner, a magenta (M) toner, a cyan (C) toner, a black (K) toner, a light magenta (LM) toner, and a light cyan (LC) toner.

9. A digital printing system according to claim 6, wherein the toners are produced by a method for producing a toner, comprising the steps of:
   (i) forming aggregated particles in a dispersion containing dispersed resin particles to thereby prepare an aggregated particle dispersion;
   (ii) adding a fine particle dispersion containing dispersed fine particles to the aggregated particle dispersion to apply the fine particles to the aggregated particles to thereby form composite particles; and
   (iii) heating the composite particles to fuse and unite the constitutional particles to thereby form toner particles.

10. A digital printing system according to claim 4, comprising a belt fixing and smoothing device comprises:
   a heating and pressuring member;
   a belt member;
   a cooling device; and
   a cooling and separating unit,
   wherein the digital printing system is so configured as to fix toners to the electrophotographic image-receiving sheet.

11. A digital printing system according to claim 10, wherein the belt member comprises a support film and a releasing layer arranged on the support film.

12. A digital printing system according to claim 11, wherein the releasing layer comprises one of a fluorocarbonsiloxane rubber layer alone or a combination of a silicone rubber layer and a fluorocarbonsiloxane rubber layer arranged on the silicone rubber layer.

13. A digital printing system according to claim 12, wherein the fluorocarbon siloxane rubber comprises a main chain which contains at least one of perfluoroalkyl ether group and perfluoroalkyl group therein.

14. A digital printing system according to claim 1, wherein the system is a sublimation dye transfer printing system using a thermal transfer image-receiving sheet comprising:
- a support; and
- an ink layer being arranged on the support and containing at least a sublimation dye.

15. A digital printing system according to claim 1, wherein the system is a marking printing system.

16. A digital printing system according to claim 1, wherein the system is so configured as to produce a print having a 45-degree glossiness of 60 degrees or more.

17. A digital printing system according to claim 1, wherein the system uses a color conversion three-dimensional look-up table (LUT).

18. A digital print produced by processing digital image data and outputting at least yellow (Y), magenta (M), and cyan (C) coloring materials,
  wherein the digital print is so configured as to reproduce:
    a yellow (Y) color having a* and b* values of −15 to 0 and +71 to +85, respectively, in the CIE 1976 (L*a*b*) color space at a blue density of 1.0 using the yellow (Y) coloring material alone;
    a magenta (M) color having a* and b* values of +50 to +65 and −30 to 0, respectively, in the CIE 1976 (L*a*b*) color space at a green density of 1.0 using the magenta (M) coloring material alone;
    a cyan (C) color having a* and b* values of −45 to −15 and −40 to −5, respectively, in the CIE 1976 (L*a*b*) color space at a red density of 1.0 using the cyan (C) coloring material alone; and
  wherein the digital print is so configured as to produce a printed output having L*, a*, and b* values of +58 to +78, +20 to +30, and +25 to +32, respectively, in the CIE 1976 (L*a*b*) color space from digital image data having red (R), green (G), and blue (B) values of 239, 167, and 127, respectively, in the RGB color space.

19. A digital print according to claim 18, wherein the print is any one of an electrophotographic print, a sublimation dye transfer print, and a marking print.

20. A digital print according to claim 18, wherein the print having a 45-degree glossiness of 60 degrees or more.

* * * * *